US012538312B2

(12) United States Patent
Dutta et al.

(10) Patent No.: US 12,538,312 B2
(45) Date of Patent: Jan. 27, 2026

(54) DYNAMIC SCHEDULING OF ONE-TO-MANY SIDELINK COMMUNICATIONS

(71) Applicant: QUALCOMM Incorporated, San Diego, CA (US)

(72) Inventors: Sourjya Dutta, San Diego, CA (US); Shuanshuan Wu, San Diego, CA (US); Qing Li, Princeton Junction, NJ (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 785 days.

(21) Appl. No.: 17/454,365

(22) Filed: Nov. 10, 2021

(65) Prior Publication Data
US 2023/0148234 A1    May 11, 2023

(51) Int. Cl.
*H04W 72/02*        (2009.01)
*H04L 1/1812*       (2023.01)
(Continued)

(52) U.S. Cl.
CPC ........... *H04W 72/21* (2023.01); *H04L 1/1812* (2013.01); *H04W 72/1263* (2013.01); *H04W 72/23* (2023.01); *H04W 72/566* (2023.01)

(58) Field of Classification Search
CPC ..... H04W 28/0278; H04W 4/40; H04W 4/46; H04W 28/08; H04W 28/0875; H04W 76/23
See application file for complete search history.

(56) References Cited

U.S. PATENT DOCUMENTS

2019/0253197 A1    8/2019  Babaei et al.
2021/0105126 A1*   4/2021  Yi .................... H04L 1/1671
(Continued)

OTHER PUBLICATIONS

3GPP TS 38.321, "3rd Generation Partnership Project; Technical Specification Group Radio Access Network; NR; Medium Access Control (MAC) protocol specification (Release 16)", 3GPP Standard; Technical Specification; 3GPP TS 38.321, V16.6.0, 3rd Generation Partnership Project, Mobile Competence Centre, 650, Route Des Lucioles, F-06921 Sophia-Antipolis Cedex, France, vol. RAN WG2, No. V16.6.0, Sep. 27, 2021, pp. 1-157, XP052056847, paragraph [5.22.1.3].
(Continued)

*Primary Examiner* — Bo Hui A Zhu
(74) *Attorney, Agent, or Firm* — Harrity & Harrity, LLP QUALCOMM Incorporated

(57) ABSTRACT

Various aspects of the present disclosure generally relate to wireless communication. In some aspects, a user equipment (UE) may transmit, to a base station, a buffer status report associated with a one-to-many sidelink communication. The UE may receive, from the base station, one or more downlink control information (DCI) messages scheduling one or more sidelink communications, associated with one or more spatial transmission directions, for the one-to-many sidelink communication, wherein the one or more DCI messages allocate resources for each of the one or more spatial transmission directions. The UE may transmit, using the resources and in the one or more spatial transmission directions, the one or more sidelink communications for the one-to-many sidelink communication. Numerous other aspects are described.

30 Claims, 11 Drawing Sheets

(51) Int. Cl.
  *H04W 72/1263* (2023.01)
  *H04W 72/21* (2023.01)
  *H04W 72/23* (2023.01)
  *H04W 72/566* (2023.01)

(56) References Cited

U.S. PATENT DOCUMENTS

| | | | | |
|---|---|---|---|---|
| 2021/0368372 | A1* | 11/2021 | Chen | H04W 24/08 |
| 2022/0007403 | A1* | 1/2022 | Li | H04W 72/23 |
| 2022/0132549 | A1* | 4/2022 | Yu | H04L 1/1812 |
| 2022/0167207 | A1* | 5/2022 | Park | H04W 28/0278 |
| 2023/0354385 | A1* | 11/2023 | Oh | H04W 72/542 |
| 2024/0365361 | A1* | 10/2024 | Salim | H04W 72/51 |

OTHER PUBLICATIONS

Apple: "Remaining Details on Mode 1 Resource Allocation", 3GPP TSG RAN WG1 #100-e, R1-2000851, 3rd Generation Partnership Project, Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020, XP051853469, 7 Pages, Subsection 2.3.1, Paragraph 0002.

International Search Report and Written Opinion—PCT/US2022/077900—ISA/EPO—Feb. 9, 2023.

Lenovo., et al., "Discussion on Resource Allocation for NR Sidelink Mode 1", 3GPP TSG RAN WG1 #99, R1-1912323, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019, 8 pages, XP051819997, The whole document.

Lenovo., et al., "Discussion on Uu-based Sidelink Resource Allocation", 3GPP TSG RAN WG1 #96, R1-1902159, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019, 4 Pages, XP051599854, The whole document.

\* cited by examiner

DYNAMIC SCHEDULING OF ONE-TO-MANY SIDELINK COMMUNICATIONS

FIELD OF THE DISCLOSURE

Aspects of the present disclosure generally relate to wireless communication and to techniques and apparatuses for dynamic scheduling of one-to-many sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a base station, a buffer status report associated with a one-to-many sidelink communication. The method may include receiving, from the base station, one or more downlink control information (DCI) messages scheduling one or more sidelink communications, associated with one or more spatial transmission directions, for the one-to-many sidelink communication, wherein the one or more DCI messages allocate resources for each of the one or more spatial transmission directions. The method may include transmitting, using the resources and in the one or more spatial transmission directions, the one or more sidelink communications for the one-to-many sidelink communication.

Some aspects described herein relate to a UE for wireless communication. The user equipment may include a memory and one or more processors coupled to the memory. The one or more processors may be configured to transmit, to a base station, a buffer status report associated with a one-to-many sidelink communication. The one or more processors may be configured to receive, from the base station, one or more DCI messages scheduling one or more sidelink communications, associated with one or more spatial transmission directions, for the one-to-many sidelink communication, wherein the one or more DCI messages allocate resources for each of the one or more spatial transmission directions. The one or more processors may be configured to transmit, using the resources and in the one or more spatial transmission directions, the one or more sidelink communications for the one-to-many sidelink communication.

Some aspects described herein relate to a non-transitory computer-readable medium that stores a set of instructions for wireless communication by a UE. The set of instructions, when executed by one or more processors of the UE, may cause the UE to transmit, to a base station, a buffer status report associated with a one-to-many sidelink communication. The set of instructions, when executed by one or more processors of the UE, may cause the UE to receive, from the base station, one or more DCI messages scheduling one or more sidelink communications, associated with one or more spatial transmission directions, for the one-to-many sidelink communication, wherein the one or more DCI messages allocate resources for each of the one or more spatial transmission directions. The set of instructions, when executed by one or more processors of the UE, may cause the UE to transmit, using the resources and in the one or more spatial transmission directions, the one or more sidelink communications for the one-to-many sidelink communication.

Some aspects described herein relate to an apparatus for wireless communication. The apparatus may include means for transmitting, to a base station, a buffer status report associated with a one-to-many sidelink communication. The apparatus may include means for receiving, from the base station, one or more DCI messages scheduling one or more sidelink communications, associated with one or more spatial transmission directions, for the one-to-many sidelink communication, wherein the one or more DCI messages allocate resources for each of the one or more spatial transmission directions. The apparatus may include means for transmitting, using the resources and in the one or more spatial transmission directions, the one or more sidelink communications for the one-to-many sidelink communication.

Some aspects described herein relate to a method of wireless communication performed by a base station. The method may include receiving, from a UE, a buffer status report associated with a one-to-many sidelink communication. The method may include transmitting, to the UE, one or more DCI messages scheduling one or more sidelink communications, associated with one or more spatial transmission directions, for the one-to-many sidelink communication, wherein the one or more DCI messages allocate resources for each of the one or more spatial transmission directions.

Some aspects described herein relate to a base station for wireless communication. The base station may include a memory and one or more processors coupled to the memory. The one or more processors may be configured to receive, from a UE, a buffer status report associated with a one-to-many sidelink communication. The one or more processors may be configured to transmit, to the UE, one or more DCI messages scheduling one or more sidelink communications, associated with one or more spatial transmission directions, for the one-to-many sidelink communication, wherein the one or more DCI messages allocate resources for each of the one or more spatial transmission directions.

Some aspects described herein relate to a non-transitory computer-readable medium that stores a set of instructions for wireless communication by a base station. The set of instructions, when executed by one or more processors of the base station, may cause the base station to receive, from a UE, a buffer status report associated with a one-to-many sidelink communication. The set of instructions, when executed by one or more processors of the base station, may cause the base station to transmit, to the UE, one or more DCI messages scheduling one or more sidelink communications, associated with one or more spatial transmission directions, for the one-to-many sidelink communication, wherein the one or more DCI messages allocate resources for each of the one or more spatial transmission directions.

Some aspects described herein relate to an apparatus for wireless communication. The apparatus may include means for receiving, from a UE, a buffer status report associated with a one-to-many sidelink communication. The apparatus may include means for transmitting, to the UE, one or more DCI messages scheduling one or more sidelink communications, associated with one or more spatial transmission directions, for the one-to-many sidelink communication, wherein the one or more DCI messages allocate resources for each of the one or more spatial transmission directions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
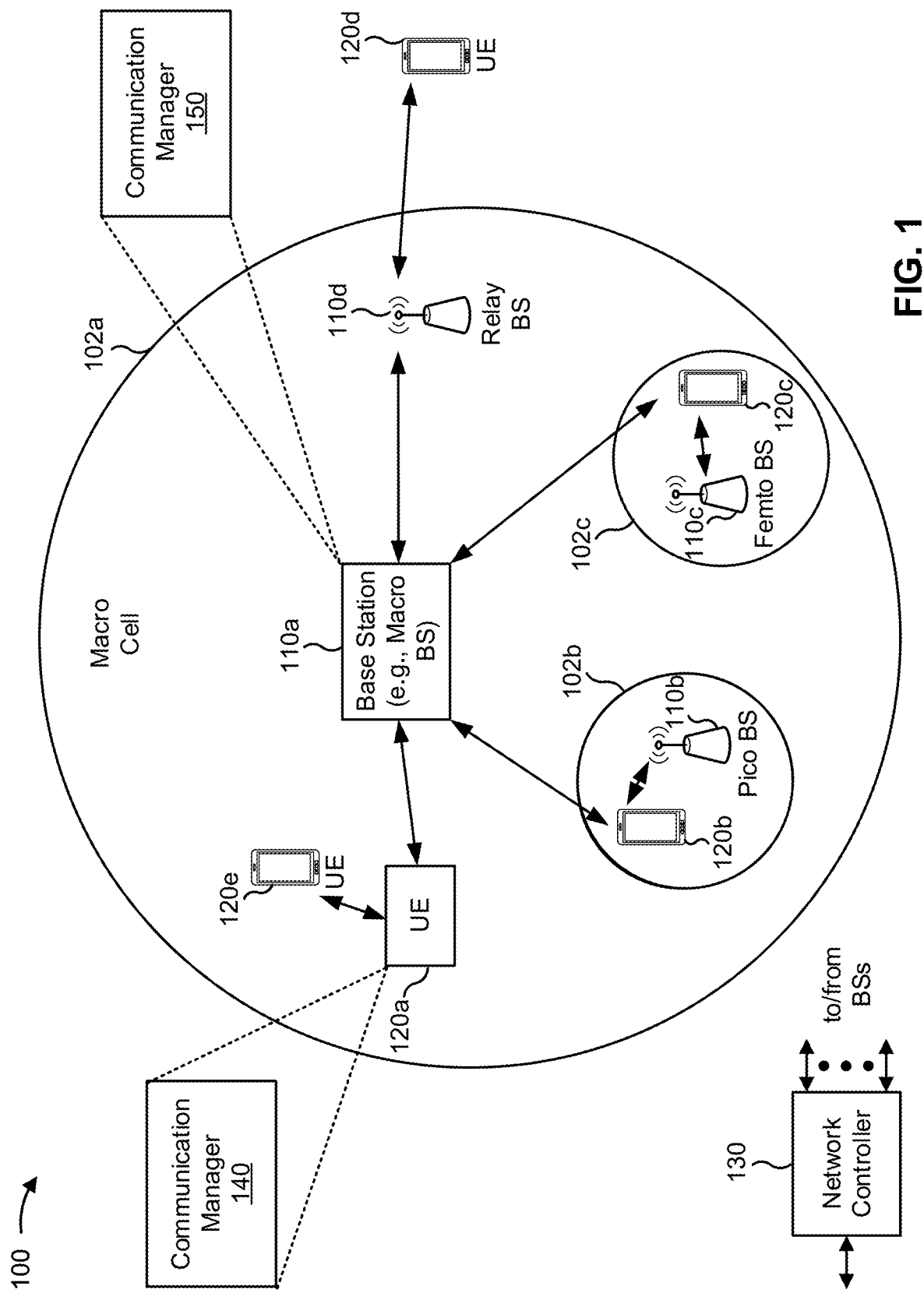
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a base station, a buffer status report associated with a one-to-many sidelink communication; receive, from the base station, one or more downlink control information (DCI) messages scheduling one or more sidelink communications, associated with one or more spatial transmission directions, for the one-to-many sidelink communication, wherein the one or more DCI messages allocate resources for each of the one or more spatial transmission directions; and transmit, using the resources and in the one or more spatial transmission directions, the one or more sidelink communications for the one-to-many sidelink communication. Additionally, or alternatively, the communication manager 140 may perform one or more other operations described herein.

In some aspects, the base station 110 may include a communication manager 150. As described in more detail elsewhere herein, the communication manager 150 may receive, from a UE, a buffer status report associated with a one-to-many sidelink communication; and transmit, to the UE, one or more DCI messages scheduling one or more sidelink communications, associated with one or more spatial transmission directions, for the one-to-many sidelink communication, wherein the one or more DCI messages allocate resources for each of the one or more spatial transmission directions. Additionally, or alternatively, the communication manager 150 may perform one or more other operations described herein.

As indicated above, FIG. 1 is provided as an example. Other examples may differ from what is described with regard to FIG. 1.

Figure 2:
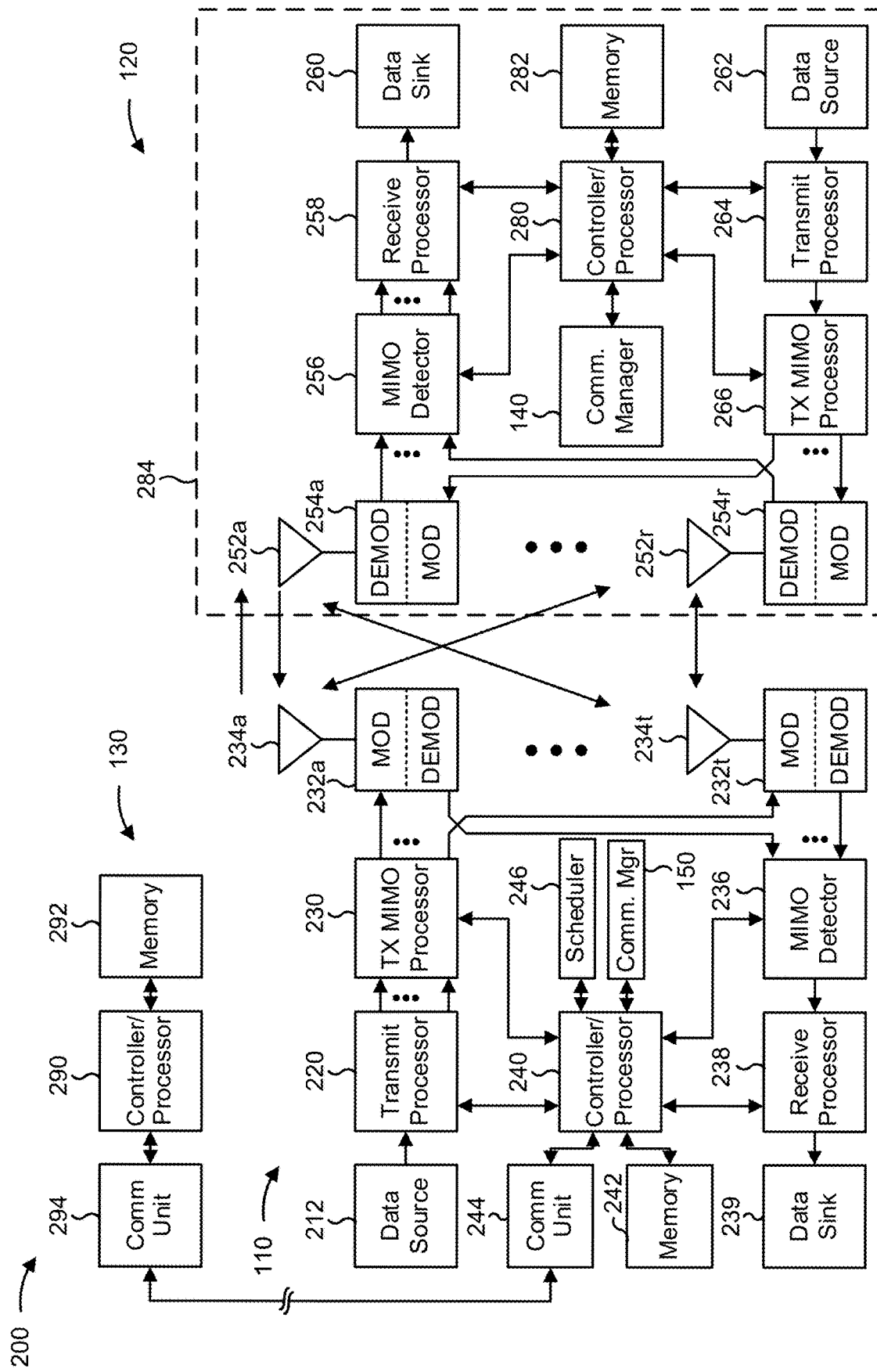
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with dynamic scheduling of sidelink one-to-many communications, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for transmitting, to a base station, a buffer status report associated with a one-to-many sidelink communication; means for receiving, from the base station, one or more DCI messages scheduling one or more sidelink communications, associated with one or more spatial transmission directions, for the one-to-many sidelink communication, wherein the one or more DCI messages allocate resources for each of the one or more spatial transmission directions; and/or means for transmitting, using the resources and in the one or more spatial transmission directions, the one or more sidelink communications for the one-to-many sidelink communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE, a buffer status report associated with a one-to-many sidelink communication; and/or means for transmitting, to the UE, one or more DCI messages scheduling one or more sidelink communications, associated with one or more spatial transmission directions, for the one-to-many sidelink communication, wherein the one or more DCI messages allocate resources for each of the one or more spatial transmission directions. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
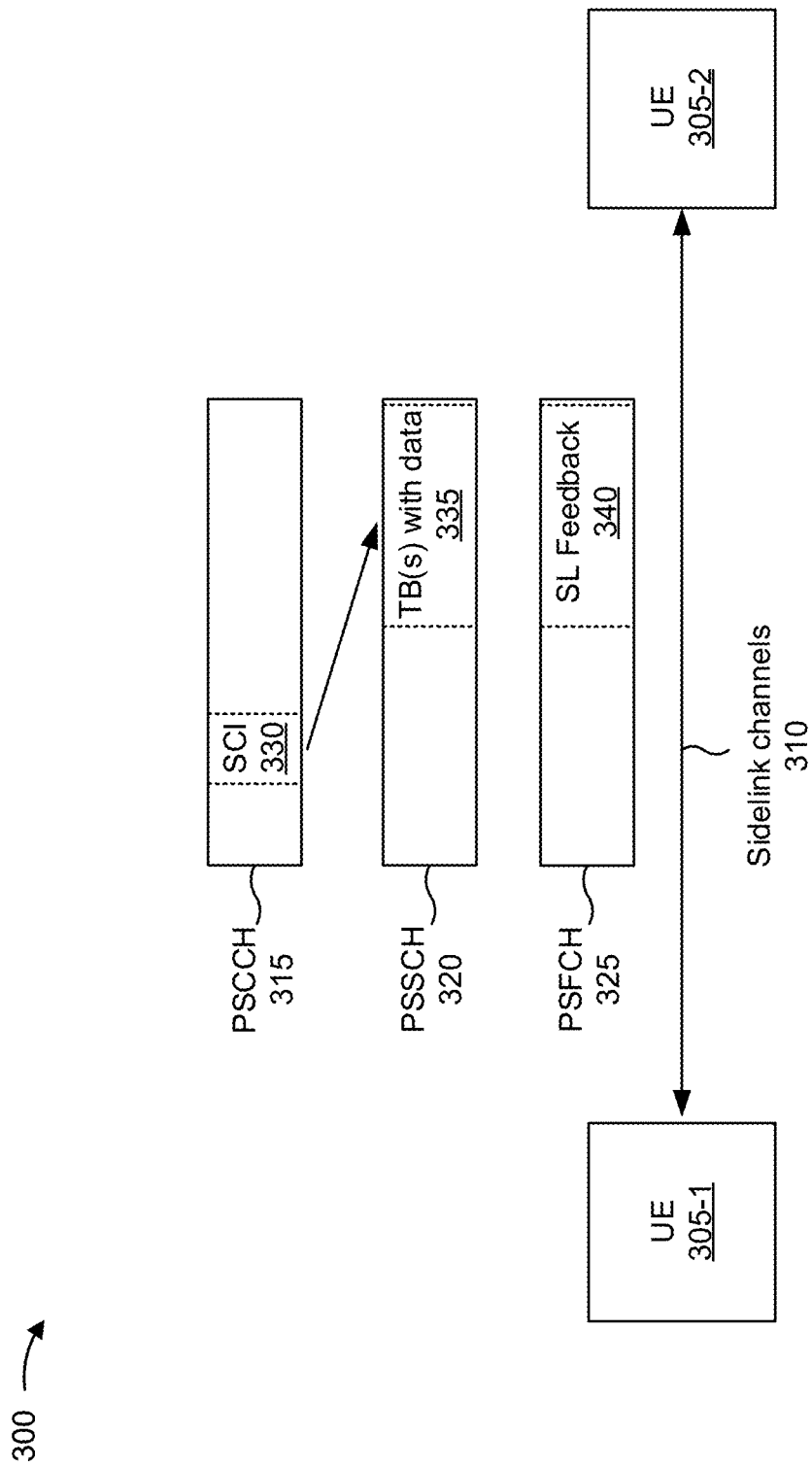
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some examples, a UE may transmit a one-to-many communication over a sidelink channel. As used herein, a "one-to-many" communication may refer to a communication that is transmitted by a single transmitter and is received by multiple receivers. Examples of one-to-many communications may include broadcast communications, groupcast communications, and/or multicast communications, among other examples. In some cases, a groupcast communication may be a communication of information to a plurality (e.g., a set) of UEs. In some cases, each of the UEs may need to join a groupcast session prior to receiving information using the groupcast communication. In some cases, the UEs may need to be authorized, or authenticated, prior to joining the groupcast session. For example, a transmitting UE or a base station 110 may indicate to a receiving UE, of the set of receiving UEs, whether the receiving UE is authorized or authenticated prior to the receiving UE joining the groupcast session and receiving information via a groupcast communication. In some cases, not all of the UEs within an area (e.g., a groupcast service area) may receive the information via the groupcast communication. For example, a UE may transmit the information to a subset of the UEs, of the set of UEs, within the groupcast service area. In some cases, a UE in the groupcast service area that has not been authorized or authenticated may not receive the information via the multicast communication. In some cases, the UE is aware of whether or not individual UEs, of the set of UEs, have received the information using the groupcast communication. "Groupcast" and "multicast" may be used interchangeably herein.

In some cases, a broadcast communication may be a communication of information to all UEs within an area (e.g., a broadcast service area). The UEs may not need to join a session prior to receiving the information using the broadcast communication. For example, the UEs do not need to access a session using NAS based signaling prior to receiving the information using the broadcast communication. In some cases, the UEs may not need to be authorized, or authenticated, prior to receiving information via a broadcast communication. In some cases, the base station 110 may transmit the information to all of the UEs within the broadcast service area. For example, the UE may not be able to broadcast the information to only a subset of the UEs. In some cases, the UE may not be aware of whether or not individual UEs, of the set of UEs, have received the information using the broadcast communication. In some cases, the broadcast communication may be referred to as a "one-to-all" communication. For example, in some cases, the UE 305 may be configured with a physical sidelink broadcast channel (PSBCH). The PSBCH may be used by the UE 305 to transmit one-to-many or one-to-all sidelink communications.

In some examples, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some examples, a UE 305 may operate using a sidelink transmission mode (e.g., Mode 1) where resource selection and/or scheduling is performed by a base station 110. For example, the UE 305 may receive a grant (e.g., in DCI or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
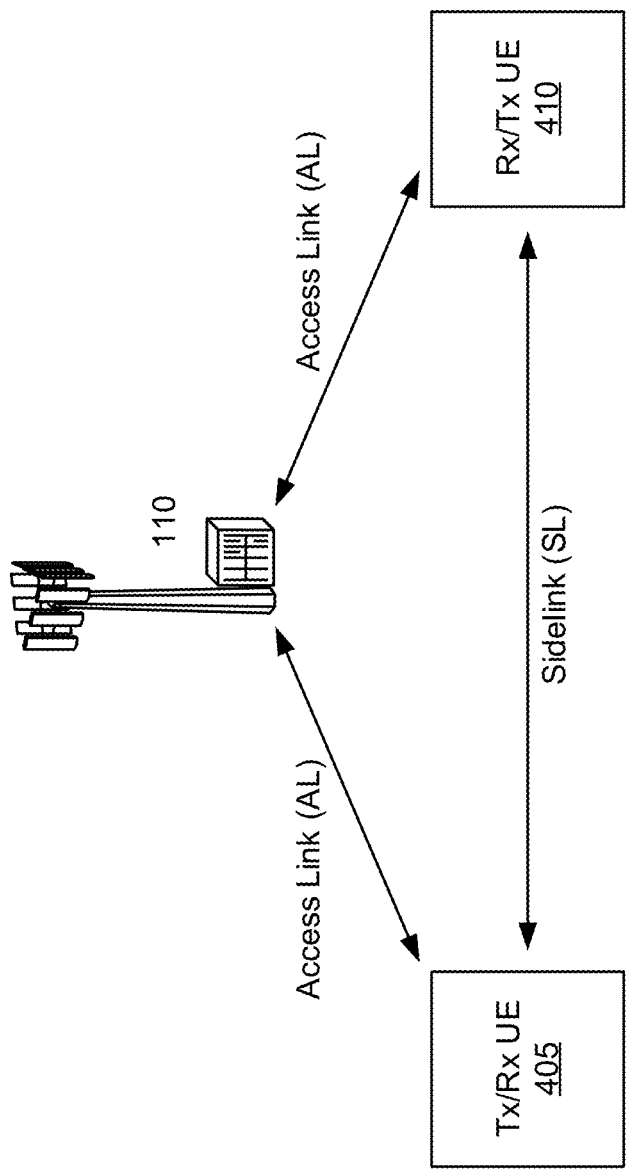
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
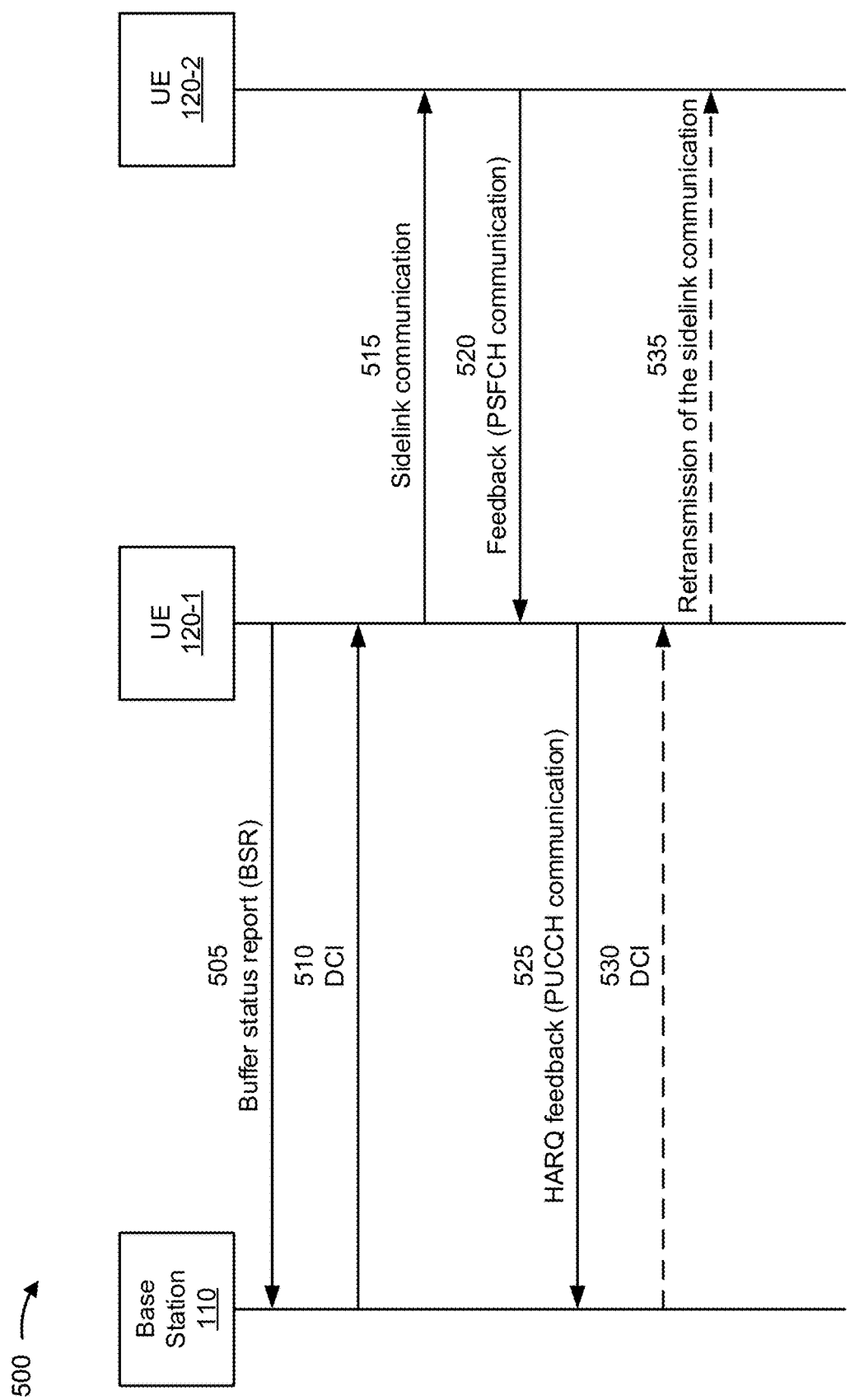
FIG. 5 is a diagram illustrating an example of Mode 1 sidelink communications, in accordance with the present disclosure.

FIG. 5 is a diagram illustrating an example 500 of Mode 1 sidelink communications, in accordance with the present disclosure. As shown in FIG. 5, a base station 110, a first UE 120-1, and a second UE 120-2 may communicate with each other in a wireless network, such as the wireless network 100. The first UE 120-1 may communicate with the second UE 120-2 (and one or more other UEs 120) via one or more sidelink channels (e.g., in a similar manner as described in connection with FIGS. 3 and 4). Additionally, the base station 110 may communicate with the first UE 120-1 and/or the second UE 120-2 via an access link. The example 500 is associated with the first UE 120-1 and the second UE 120-2 operating in the Mode 1 sidelink transmission mode where resource selection and/or scheduling is performed by the base station 110. In the example 500, the first UE 120-1 may be a sidelink transmitter and the second UE 120-2 may be a sidelink receiver. However, the second UE 120-2 may transmit sidelink communications and the first UE 120-1 may receive sidelink communications in a similar manner as described herein.

As shown by reference number 505, the first UE 120-1 may transmit, and the base station 110 may receive, a buffer status report (BSR). The buffer status report may be a medium access control (MAC) control element (MAC-CE) (e.g., the buffer status report may be transmitted via MAC signaling). The buffer status report may indicate a destination identifier (e.g., an identifier associated with a destination of a sidelink communications, such as associated with the second UE 120-2), a logical channel group identifier, and/or a size of a MAC buffer of the first UE 120-1 (e.g., indicating a size of one or more sidelink communications to be transmitted), among other examples. The buffer status report may be associated with one or more MAC protocol data units (PDUs). The first UE 120-1 may transmit the buffer status report in accordance with a periodic schedule (e.g., the first UE 120-1 may be configured to transmit buffer status reports to the base station 110 periodically). Additionally, or alternatively, the first UE 120-1 may transmit the buffer status report based at least in part on detecting that new sidelink data is available, or has arrived, at the MAC layer (e.g., in the MAC buffer). In some examples, a configuration (e.g., an RRC configuration) may indicate a manner in which the first UE 120-1 is to transmit buffer status reports to the base station 110 (e.g., periodically and/or based at least in part on new data arriving at the MAC layer).

The base station 110 may use the information indicated by the buffer status report to determine one or more sidelink grants for the first UE 120-1. For example, the base station 110 may allocate one or more resources (e.g., one or more time-frequency resources) for the first UE 120-1 to transmit a sidelink communication based at least in part on the information indicated by the buffer status report. As shown by reference number 510, the base station 110 may transmit, and the first UE 120-1 may receive, DCI indicating a sidelink grant for a sidelink communication. The DCI may indicate one or more resources (e.g., one or more time-frequency resources) to be used by the first UE 120-1 to transmit the sidelink communication (e.g., to transmit a MAC PDU on a sidelink channel). In some examples, the DCI may indicate one or more resources (e.g., one or more time-frequency resources) to be used by the first UE 120-1 to transmit one or more retransmissions of the sidelink communication. In some examples, the DCI may indicate one or more uplink resources (e.g., one or more time-frequency resources) to be used by the first UE 120-1 to transmit HARQ feedback, associated with the sidelink communication, to the base station 110. For example, the DCI may indicate one or more PUCCH resources to be used by the first UE 120-1 to transmit HARQ feedback to the base station 110. In some examples, the DCI may use a DCI format associated with providing sidelink grants. For example, the DCI may use a DCI format 3_0 (e.g., as defined, or otherwise fixed, by a wireless communication standard, such as the 3GPP).

As shown by reference number 515, the first UE 120-1 may transmit, and the second UE 120-2 may receive, the sidelink communication (e.g., that is scheduled by the DCI). For example, the first UE 120-1 may transmit the sidelink communication using resources (e.g., time-frequency resources) that are indicated by the DCI. In some examples, the sidelink communication may be, or may include, a MAC PDU. The first UE 120-1 may transmit the sidelink communication via a sidelink channel, such as the PSCCH and/or the PSSCH. As shown by reference number 520, the second UE 120-2 may transmit, and the first UE 120-1 may receive, feedback information associated with the sidelink communication. For example, the second UE 120-2 may transmit feedback information indicating whether the sidelink communication was successfully received by the second UE 120-2, such as ACK/NACK feedback. The second UE 120-2 may transmit the feedback information via the PSFCH. In some examples, the first UE 120-1 may transmit a retransmission (e.g., using resources for a retransmission as indicated by the DCI) based at least in part on the feedback information from the second UE 120-2 indicating that the sidelink communication was not successfully received by the second UE 120-2. In such examples, the second UE 120-2 may transmit, and the first UE 120-1 may receive, feedback information associated with the retransmission (e.g., in a similar manner as described above).

As shown by reference number 525, the first UE 120-1 may transmit, and the base station 110 may receive, HARQ feedback information associated with a sidelink channel. For example, the first UE 120-1 may transmit HARQ feedback information associated the sidelink communication transmitted by the first UE 120-1. The HARQ feedback information may indicate whether the sidelink communication was successfully communicated by the first UE 120-1 (e.g., may indicate whether the second UE 120-2 successfully received the sidelink communication). The base station 110 may use the HARQ feedback information to schedule future sidelink communications. For example, if the HARQ feedback information indicates that the sidelink communication was not successfully transmitted by the first UE 120-1, then the base station 110 may allocate sidelink resources for the first UE 120-1 to retransmit the sidelink communication. For example, as shown by reference number 530, the base station 110 may transmit, and the first UE 120-1 may receive, DCI indicating a sidelink grant for the retransmission of the sidelink communication (e.g., in a similar manner as described above). As shown by reference number 535, the first UE 120-1 may transmit, and the second UE 120-2 may receive, the retransmission of the sidelink communication (e.g., using time-frequency resources indicated by the DCI). In this way, the base station 110 may schedule and/or allocate resources for sidelink communications.

Some wireless networks may use higher frequencies for communications (such as in a millimeter wave frequency) to enable additional bandwidth allocation, improved data rates, and/or improved data capacity, among other examples. However, the higher frequency communications may be associated with a higher pathloss than other frequencies for communication (such as sub-6 GHz communications), thereby reducing a communication range. As a result, a UE may use one or more phased array antennas and/or beamforming when communicating using the higher frequencies. For example, a UE may use beamforming and/or spatial filtering to achieve a range and/or to meet quality requirements (e.g., QoS requirements) for communications that use the higher frequencies, such as a millimeter wave frequency. By increasing a quantity of antenna elements in an array, a UE may form a beam (e.g., reduce an angular spread of a transmission) to improve signal-to-noise ratio (SNR), thereby improving communication range and/or improving signal strength or quality in a given spatial direction. Similarly, a UE may receive communications using beamforming. For example, a UE may receive signals over a given angular range or in a given spatial direction. A UE may be capable of transmitting using one or more beams (e.g., in one or more spatial directions or angular ranges) based at least in part on a hardware configuration of the UE.

However, using beamformed communications may result in UEs that are not in the spatial direction or angular range associated with a beam not receiving a signal transmitted via the beam. For example, if a UE transmits a sidelink communication using a beam (e.g., in a given spatial direction or over a given angular range), UEs that are physically positioned outside of the angular range associated with the beam may not receive the sidelink communication. In a unicast scenario (e.g., in a one-to-one transmission scenario), a UE may identify a location of another UE that is the intended receiver of a unicast sidelink communication. The UE may be enabled to use a beam that is directed toward the location of the other UE to ensure that the other UE is enabled to receive the unicast sidelink communication. For example, point-to-point communication links between UEs may be established and maintained through beam search and/or beam management procedures.

For one-to-many communications (e.g., broadcast communications, multicast communications, and/or groupcast communications), the communications may be required to be transmitted over a large angular range. For example, one-to-many communications may have intended receivers that are located in different physical locations. Therefore, a one-to-many communication may be transmitted over a large angular range to ensure that all of the intended receivers are enabled to receive the one-to-many communication. For example, for a broadcast communication, a UE may transmit the broadcast communication over an entire angular range (e.g., over approximately a 360 degree angular range) to ensure that all receivers located within a communication range of the UE are enabled to receive the broadcast communication. In sub-6 GHz frequency ranges, transmissions by a UE may be near omnidirectional (e.g., may be over a large or an entire angular range) because one antenna element (or a small number of antenna elements) may be used by the UE. However, in wireless communication systems that use beamformed communications, additional complexities are introduced for transmitting one-to-many communications. For example, the one-to-many communication may need to be transmitted using multiple beams to ensure that the one-to-many communication is transmitted over a large, or an entire, angular range (e.g., while satisfying a required quality of service over the angular range).

As described above, when operating in a Mode 1 sidelink transmission mode, sidelink communications to be transmitted by a UE may be scheduled by a base station. DCI, transmitted by the base station to the UE, may indicate time-frequency resources and/or a precoder or beam to be used to transmit a sidelink communication. For example, a precoder may be used by a UE and/or a base station to configure one or more MIMO layers and/or one or more antenna beams for improved transmission and reception of wireless communications (e.g., for an improved signal-to-noise ratio). Different precoders may be used to apply different weights to values associated with one or more antennas, signals, transmission powers, transmission chains, and/or reception chains, among other examples. However, the DCI may schedule a transmission of a packet (e.g., a sidelink transmission or a MAC PDU) using a given beam, in a given spatial directions, and/or using a given precoder. The base station may be unable to schedule a UE to transmit the same sidelink communication (e.g., the same MAC PDU) over different beams, using different precoders, and/or using different beamforming vectors, among other examples. As a result, the UE may be unable to effectively or efficiently transmit a dynamically scheduled one-to-many sidelink communication (e.g., when operating in the Mode 1) because the base station may be unable to schedule the UE to transmit the one-to-many sidelink communication over different beams, using different precoders, and/or using different beamforming vectors, among other examples. Therefore, the UE may not transmit the one-to-many sidelink communication over large, or entire, angular range, thereby resulting in one or more intended receivers of the one-to-many sidelink communication not receiving the one-to-many sidelink communication.

Some techniques and apparatuses described herein enable dynamic scheduling of sidelink one-to-many communications. For example, some techniques and apparatuses described herein enable dynamic scheduling of one-to-many sidelink communications (e.g., broadcast communications, groupcast communications, and/or multicast communications) in a Mode 1 transmission mode where beamformed communications are used. For example, a base station may transmit, and a UE may receive, one or more DCI messages that schedules a one-to-many communication on a per-spatial transmission direction (or per-beam) basis. In other words, the one or more DCI messages may schedule a UE to transmit the same sidelink communication in different spatial transmission directions, using different beams (e.g., the DCI message(s) may indicate a different beam index), using different precoders (e.g., the DCI message(s) may indicate a different precoder index), and/or using different sidelink transmission configuration indicator (TCI) states, among other examples. In some aspects, the UE may transmit, and the base station may receive, a buffer status report associated with the one-to-many communication. In some aspects, the buffer status report may indicate one or more spatial transmission directions, one or more beams, one or more precoders, and/or one or more sidelink TCI states to be associated with the one-to-many communication. In some aspects, the base station may transmit the one or more DCI messages (e.g., that schedule the one-to-may communication on a per-beam basis or per-spatial transmission direction basis) based at least in part on receiving the buffer status report.

In some aspects, the one or more DCI messages may include a DCI message for each spatial transmission direction associated with the one-to-many sidelink communication. In some other aspects, the one or more DCI messages may be a single DCI message that includes multiple sidelink grants (e.g., a sidelink grant for each spatial transmission direction associated with the one-to-many sidelink communication). In some aspects, the UE may transmit, and the base station may receive, feedback (e.g., HARQ feedback) on a per-beam basis or per-spatial transmission direction basis. In other words, the UE may transmit (e.g., via the PUCCH) HARQ feedback associated with different beams or different spatial transmission direction for the same one-to-many sidelink communication.

As a result, dynamic scheduling (e.g., by a base station) of one-to-many sidelink communications for a UE operating using beamformed communications may be enabled. For example, DCI transmitted by the base station may identify spatial transmission directions, beams, precoders, and/or sidelink TCI states that are to be used by the UE for the same one-to-many sidelink communication. Moreover, the DCI may allocate resources for each of the spatial transmission directions, beams, precoders, and/or sidelink TCI states, thereby enabling the UE to transmit the same sidelink communication over multiple spatial transmission directions, beams, precoders, and/or sidelink TCI states. As a result, the UE may be enabled to effectively and efficiently transmit one-to-many sidelink communications when operating in a Mode 1 and when using beamformed communications.

As indicated above, FIG. 5 is provided as an example. Other examples may differ from what is described with respect to FIG. 5.

Figure 6:
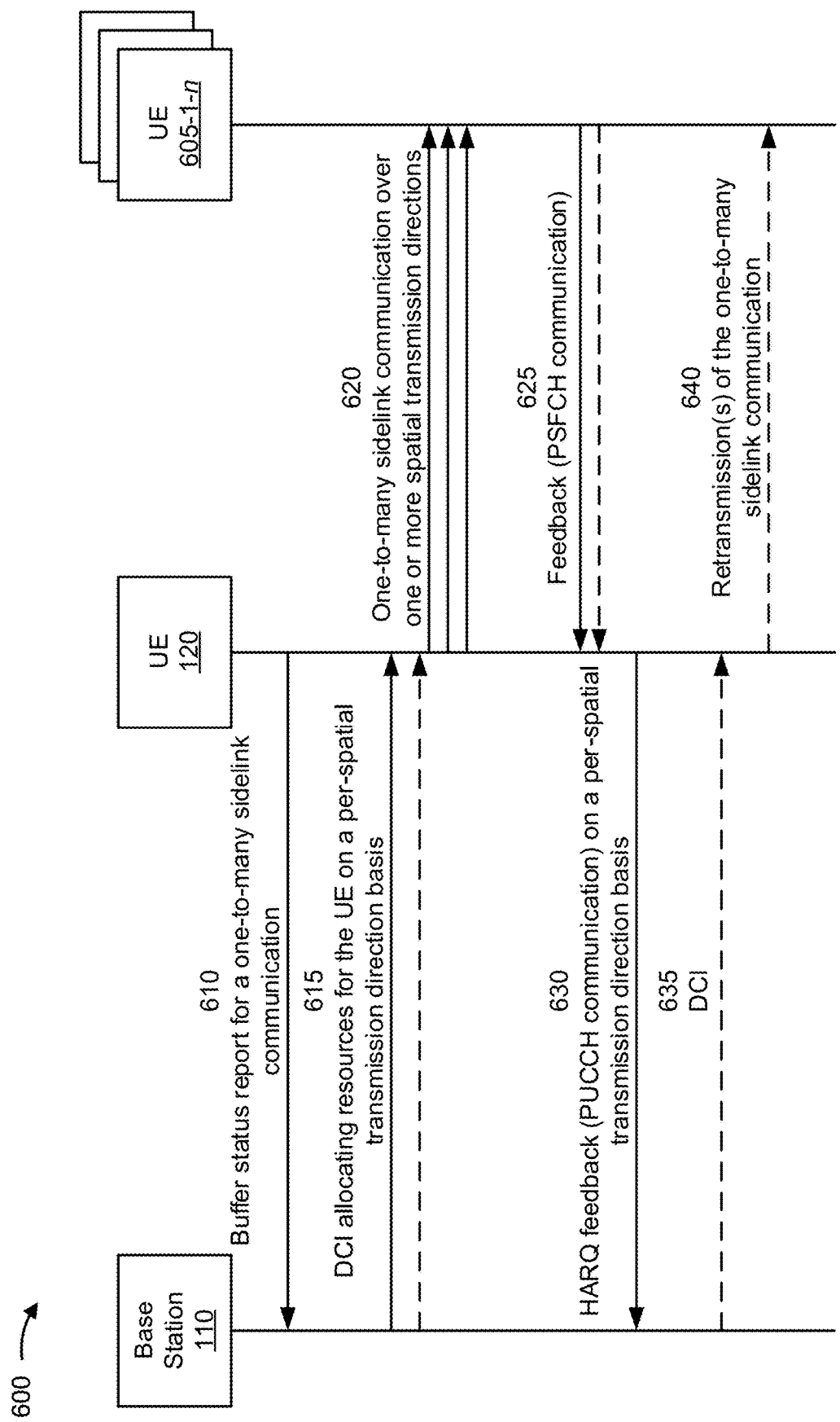
FIG. 6 is a diagram illustrating an example of dynamic scheduling of one-to-many sidelink communications, in accordance with the present disclosure.

FIG. 6 is a diagram illustrating an example 600 of dynamic scheduling of one-to-many sidelink communications, in accordance with the present disclosure. As shown in FIG. 6, a base station 110, a UE 120, and one or more UEs 605-1 through 605-n may communicate with each other in a wireless network, such as the wireless network 100. The UE 120 may communicate with the UEs 605-1 through 605-n (and one or more other UEs 120) via one or more sidelink channels (e.g., in a similar manner as described in connection with FIGS. 3 and 4). Additionally, the base station 110 may communicate with the UE 120 and/or the UEs 605-1 through 605-n via an access link. The example 600 is associated with the UE 120 and the UEs 605-1 through 605-n operating in the Mode 1 sidelink transmission mode (e.g., where resource selection and/or scheduling is performed by the base station 110). In the example 600, the UE 120 may be a sidelink transmitter and the second UEs 605-1 through 605-n may be a sidelink receivers. However, the UEs 605-1 through 605-n may transmit sidelink communications (e.g., one-to-many sidelink communications), and the UE 120 may receive sidelink communications (e.g., one-to-many sidelink communications) in a similar manner as described herein.

As shown by reference number 610, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), a buffer status report associated with a one-to-many sidelink communication. The buffer status report may indicate information associated with a buffer (e.g., a MAC buffer or another buffer) of the UE 120. In some aspects, the buffer status report may use the same format as a buffer status report associated with unicast sidelink communications and/or point-to-point sidelink communications. In such examples, the buffer status report may indicate that the buffer status report is associated with the one-to-many sidelink communication based at least in part on a logical channel group identifier indicated by the buffer status report. For example, the buffer status report may include an indication of a logical channel group identifier (LCG-ID). The logical channel group identifier may indicate a Layer 2 (e.g., a MAC layer, a packet data convergence protocol (PDCP) layer, and/or a radio link control (RLC) layer) destination identifier. The logical channel group identifier may be associated with one-to-many sidelink communications. For example, the logical channel group identifier may indicate (e.g., implicitly) that the one-to-many sidelink communication (e.g., the PDU) associated with the buffer status report is associated with a beamformed transmission (e.g., is associated with a millimeter wave transmission). Additionally, or alternatively, the logical channel group identifier may indicate (e.g., implicitly) a cast-type associated with the one-to-many sidelink communication. "Cast-type" may refer to a type of sidelink communication, such as unicast, broadcast, groupcast, and/or multicast, among other examples.

For example, a first set of logical channel group identifiers may be associated with non-beamformed communications (e.g., FR1 sidelink communications) and a second set of logical channel group identifiers may be associated with beamformed communications (e.g., millimeter wave and/or FR2 sidelink communications). The second set of logical channel group identifiers may include a first subset of logical channel group identifiers associated with unicast sidelink communications, a second subset of logical channel group identifiers associated with broadcast sidelink communications, a third subset of logical channel group identifiers associated with groupcast sidelink communications, and so on.

The UE 120 may include logical channel group identifier from the second set of logical channel group identifiers to indicate that the one-to-many sidelink communication is a beamformed communication. Additionally, the UE 120 may include logical channel group identifier from a subset of logical channel group identifiers, of the second set of logical channel group identifiers, that is associated with a one-to-many cast type (e.g., broadcast, multicast, and/or groupcast). For example, if the one-to-many sidelink communication is a broadcast communication, then the UE 120 may include (e.g., in the buffer status report) a logical channel group identifier from the second subset of logical channel group identifiers. As another example, if the one-to-many sidelink communication is a broadcast communication, then the UE 120 may include (e.g., in the buffer status report) a logical channel group identifier from the third subset of logical channel group identifiers. In such examples, the base station 110 may determine a quantity of spatial transmission directions, precoders, beams, and/or sidelink TCI states to be associated with the one-to-many sidelink communication (e.g., to be cycled by the UE 120 over one or more sidelink transmissions) based at least in part on the logical channel group identifier included in the buffer status report. For example, the base station 110 may autonomously (e.g., without an explicit indication from the UE 120 and/or another device) determine a quantity of beams required to be swept (e.g., by the UE 120) for the one-to-many sidelink communication based at least in part on the logical channel group identifier included in the buffer status report.

In this way, the buffer status report may implicitly indicate that the PDU associated with the buffer status report is a beamformed communication and that the PDU is associated with the one-to-many sidelink communication. Additionally, this may enable the same format to be used for buffer status reports that are associated with beamformed communications and non-beamformed communications, thereby reducing a complexity associated with generating and/or transmitting the buffer status reports.

In some other aspects, the buffer status report may use a different format than a format used for buffer status reports associated with non-beamformed communications and/or for unicast or point-to-point communications. For example, the buffer status report may use a format that is associated with beamformed communications (e.g., millimeter wave and/or FR2 communications). Additionally, or alternatively, the format may be associated with one-to-many communications (e.g., broadcast, groupcast, and/or multicast communications). For example, sub-6 GHz sidelink communications and/or beamformed unicast sidelink communication may use a first format of buffer status reports, such as a format defined, or otherwise fixed, by Release 16 of the 3GPP Technical Specifications. Beamformed communications and/or one-to-many sidelink communication may use an enhanced format for buffer status reports. For example, the buffer status report transmitted by the UE 120 may include an indication of a quantity of spatial transmission directions (e.g., beams, precoders, and/or sidelink TCI states) to be associated with the PDU (e.g., to be associated with the one-to-many sidelink communications). Additionally, or alternatively, the buffer status report transmitted by the UE 120 may include an indication of a cast-type associated with the one-to-many sidelink communication. Additionally, or alternatively, the buffer status report transmitted by the UE 120 may include an indication of a HARQ feedback type associated with the one-to-many sidelink communication (e.g., to enable the base station 110 and/or the UE 120 to determine beam-based PSFCH resources to be associated with the one-to-many sidelink communication). Additionally, or alternatively, the buffer status report transmitted by the UE 120 may include an indication of one or more priorities associated with one or more spatial transmission directions. For example, the buffer status report may include a priority per-spatial transmission direction (e.g., for each spatial transmission direction, for each beam, and/or for each sidelink TCI state). The one or more priorities associated with one or more spatial transmission directions may be in addition to priorities associated with the logical channel(s) indicated by the buffer status report. For example, the one or more priorities associated with one or more spatial transmission directions may indicate a directional priority of transmissions to be associated with the one-to-many sidelink communication.

In some aspects, the UE 120 may determine (e.g., using controller/processor 280 and/or memory 282) the quantity of spatial transmission directions (e.g., beams, precoders, and/or sidelink TCI states) to be associated with the PDU (e.g., to be associated with the one-to-many sidelink communications) and/or the one or more priorities associated with one or more spatial transmission directions based at least in part on sensor information (e.g., information received from one or more sensors of the UE 120) and/or based at least in part on an Application layer indication (e.g., an indication received from an Application layer of the UE 120). In some aspects, the UE 120 may determine the quantity of spatial transmission directions (e.g., beams, precoders, and/or sidelink TCI states) to be associated with the PDU (e.g., to be associated with the one-to-many sidelink communications) and/or the one or more priorities associated with one or more spatial transmission directions based at least in part on a configuration (e.g., configuration received from the base station 110, a pre-configuration, an original equipment manufacturer (OEM) configuration, and/or a hardcoded configuration) provided to the UE 120.

The base station 110 may determine (e.g., using controller/processor 240 and/or memory 242) a set of spatial transmission directions to be associated with the one-to-many sidelink communication (e.g., to be associated with the same PDU) based at least in part on the buffer status report. For example, the base station 110 may determine one or more spatial transmission directions, one or more precoders, one or more beams, and/or one or more sidelink TCI states, among other examples, to be associated with the one-to-many sidelink communication. For example, the set of spatial transmission directions may be a set of spatial transmission directions that are to be swept through (e.g., over one or more sidelink transmissions) by the UE 120 for the same one-to-many sidelink communication (e.g., to enable the one-to-many sidelink communication to be transmitted over a large angular range in a beamformed wireless communication system).

In some aspects, the base station 110 may determine a DCI grant type to be used for the one-to-many sidelink communication. For example, DCI grant types may include scheduling one-by-one DCI messages for each spatial transmission direction associated with the one-to-many sidelink communication or scheduling the UE 120 to transmit over multiple spatial transmission directions using a single DCI message, among other examples. Additionally, or alternatively, DCI grant types may include a first grant type associated with indicating a precoder index, a second grant type associated with indicating a beam index, and/or a third grant type associated with indicating a sidelink TCI state. The different DCI grant types are explained in more detail elsewhere herein. In some aspects, the base station 110 may determine the DCI grant type based at least in part on the buffer status report. For example, the base station 110 may determine the DCI grant type based at least in part on a buffer size, a logical channel priority, a spatial transmission direction priority, and/or a beam priority, among other examples. For example, a first DCI grant type (e.g., a one-by-one grant type) may be selected if the buffer size satisfies a threshold and a second DCI grant type (e.g., a single DCI scheduling transmissions over multiple spatial transmission directions) may be selected if the buffer size does not satisfy the threshold. As another example, if a logical channel priority value satisfies a threshold (e.g., indicates a high priority), then the first DCI grant type may be selected. If the logical channel priority value does not satisfy the threshold (e.g., indicates a low priority), then the second DCI grant type may be selected.

A DCI grant type may be associated with sidelink resources. For example, a DCI grant type may be associated with one or more sidelink resource pools. Therefore, by selecting a DCI grant type, the base station 110 may select sidelink resources (e.g., one or more sidelink resource pools) to be associated with one-to-many sidelink communications (e.g., may select one or more sidelink resource pools to be associated with one-to-many sidelink communications).

Additionally, or alternatively, the base station 110 may determine the DCI grant type based at least in part on a sidelink UE information message and/or a sidelink UE assistance information message transmitted by the UE 120. For example, the UE 120 may indicate one or more DCI grant types supported or selected by the UE 120. For example, in some cases, the UE 120 may not support sidelink TCI states. Therefore, the sidelink UE information message and/or a sidelink UE assistance information message may indicate that DCI grant types associated with indicating precoder indices or beam indices are supported by the UE 120. As another example, sidelink measurements associated with TCI states may not be configured for the UE 120. Therefore, the sidelink UE information message and/or a sidelink UE assistance information message may indicate that DCI grant types associated with indicating precoder indices or beam indices are supported by the UE 120.

In some aspects, the base station 110 may determine the DCI grant type based at least in part on a service type associated with the one-to-many sidelink communication. For example, the base station 110 may determine the DCI grant type based at least in part on latency requirements and/or a QoS requirement associated with the one-to-many sidelink communication. For example, a single DCI scheduling transmissions over multiple spatial transmission directions may be associated with lower latency for the one-to-many sidelink communication because the UE 120 may transmit the one-to-many sidelink communication over multiple spatial directions after receiving the single DCI message (e.g., without waiting for additional DCI message). Therefore, UEs over a wider angular range may receive the one-to-many sidelink communication after the single DCI message. As a result, if the one-to-many sidelink communication is associated with strict latency requirements, then the base station 110 may select the DCI grant type associated with a single DCI scheduling transmissions over multiple spatial transmission directions, as described in more detail elsewhere herein.

The base station 110 may transmit (e.g., using controller/processor 240, transmit processor 220, TX MIMO processor 230, MOD 232, antenna 234, and/or memory 242), and the UE 120 may receive (e.g., using antenna 252, DEMOD 254, MIMO detector 256, receive processor 258, controller/processor 280, and/or memory 282), an indication of the DCI grant type to be associated with one-to-many sidelink communications. For example, the indication may be transmitted via an RRC configuration message, a semi-static configuration message, a MAC-CE, a dynamic message, and/or a DCI message, among other examples. The DCI grant type may be indicated for a service type, for a cast type, and/or for a destination identifier (e.g., a Layer 2 destination identifier).

As shown by reference number 615, the base station 110 may transmit (e.g., using controller/processor 240, transmit processor 220, TX MIMO processor 230, MOD 232, antenna 234, and/or memory 242), and the UE 120 may receive (e.g., using antenna 252, DEMOD 254, MIMO detector 256, receive processor 258, controller/processor 280, and/or memory 282), one or more DCI messages scheduling one or more transmissions for the one-to-many sidelink communication. For example, the one or more DCI messages may schedule the one-to-many sidelink communication on a per-spatial transmission direction or per-beam basis. In other words, the one or more DCI messages may allocate resources (e.g., to be used by the UE 120) for a sidelink transmission of the one-to-many sidelink communication in each spatial transmission direction associated with the one-to-many sidelink communication. The one or more DCI messages may indicate beams, precoders, and/or sidelink TCI states to be used by the UE 120 for one or more sidelink communications. For example, each sidelink communication may be the one-to-many sidelink communication (e.g., may transmit the same information or data). However, the one or more sidelink communications may be associated with different spatial transmission directions. For example, the one or more DCI messages may indicate resources to be used by the UE 120 to transmit the one-to-many sidelink communication over one or more spatial transmission directions, where each spatial transmission direction is associated with a sidelink communication scheduled by the one or more DCI.

In some aspects, the one or more DCI messages may indicate one or more uplink control channel resources (e.g., PUCCH resources) associated with HARQ feedback for the one or more sidelink communications. The one or more DCI messages may indicate that HARQ feedback is to be provided for each of the one or more sidelink communications or for each of the one or more spatial transmission directions. In other words, the one or more DCI messages may indicate that the UE 120 is to provide HARQ feedback, associated with the one-to-many sidelink communication, on a per-beam basis or a per-spatial transmission direction basis. For example, the one or more DCI messages may indicate that the UE 120 is to provide HARQ feedback, associated with the one-to-many sidelink communication, for each spatial transmission direction in which the UE 120 transmitted the one-to-many sidelink communication.

In some aspects, the one or more DCI messages may include separate DCI messages allocating resources for each spatial transmission direction in which the UE 120 transmitted the one-to-many sidelink communication. In other words, the base station 110 may transmit, and the UE 120 may receive, separate DCI messages for each of the one or more sidelink communications associated with the one-to-many sidelink communication. For example, the base station 110 may schedule the UE 120 to transmit the one-to-many sidelink communication over one or more spatial transmission directions one in a one-by-one manner (e.g., where the base station 110 transmits a first DCI message for a first spatial transmission direction, a second DCI message for a second spatial transmission direction, a third DCI message for a third spatial transmission direction, and so on). In some other aspects, the one or more DCI messages may include at least one DCI message that is associated with multiple sidelink communications (e.g., sidelink transmissions) or multiple spatial transmission directions. For example, a single DCI message may indicate a sidelink grant for each of the one or more sidelink communications to be transmitted by the UE 120. In other words, a single DCI message may indicate multiple sidelink grants for the one or more sidelink communications to be transmitted by the UE 120. A sidelink grant may indicate time-frequency resources and/or other information associated with a sidelink communication.

In cases where a one-by-one approach is used by the base station 110 to schedule the UE 120 to transmit the one-to-many sidelink communication over one or more spatial transmission directions, the base station 110 may determine a set of spatial transmission directions to be associated with the one-to-many sidelink communication (e.g., based at least in part on the buffer status report transmitted by the UE 120). Additionally, the base station 110 may determine an order of the set of spatial transmission directions (e.g., an order in which the UE 120 is to transmit sidelink communications in the set of spatial transmission directions). For example, the base station 110 may determine a set of precoders (e.g., a set of precoder indices) to be associated with the one-to-many sidelink communication. As another example, the base station 110 may determine a set of beams (e.g., a set of beam indices) to be associated with the one-to-many sidelink communication. As another example, the base station 110 may determine a set of sidelink TCI states to be associated with the one-to-many sidelink communication. The base station 110 may schedule a sidelink communication for each of the one or more spatial transmission directions in a one-by-one manner. For example, the base station 110 may transmit, and the UE 120 may receive, a first DCI message indicating a first set of time-frequency resources for a first sidelink communication (e.g., a first transmission of the one-to-many sidelink communication) in a first spatial transmission direction. The UE 120 may transmit, and the base station 110 may receive, HARQ information associated with the first sidelink communication (e.g., as described in more detail elsewhere herein, such as in connection with reference number 630). The base station 110 may re-send a sidelink grant (e.g., in a DCI message) until the first sidelink communication is completed (e.g., until ACK feedback is received by the base station 110 or until a maximum quantity of retransmissions of the first sidelink communication is reached). After the first sidelink communication is completed, the base station 110 may transmit, and the UE 120 may receive, a second DCI message indicating a second set of time-frequency resources for a second sidelink communication (e.g., a second transmission of the one-to-many sidelink communication) in a second spatial transmission direction. The base station 110 may perform similar operations as described above until the second sidelink communication is completed. After the second sidelink communication is completed, the base station 110 may transmit, and the UE 120 may receive, a third DCI message indicating a third set of time-frequency resources for a third sidelink communication (e.g., a third transmission of the one-to-many sidelink communication) in a third spatial transmission direction. The base station 110 may continue to allocate resources for the one-to-many sidelink communication for each of the spatial transmission directions (e.g., each of the precoders, beams, and/or sidelink TCI states) associated with the one-to-many sidelink communication.

In some aspects, an initial DCI message (e.g., a DCI message transmitted first in the time domain), of the one or more DCI messages, may include an indication that the initial DCI message is associated with new data. For example, an NDI field of the initial DCI message may indicate that the initial DCI message is associated with new data (e.g., the NDI field may be set of a value of "1"). Remaining DCI messages (e.g., DCI messages transmitted after the initial DCI message in the time domain), of the one or more DCI messages, may not include an indication that the DCI messages are associated with new data. For example, an NDI field of the remaining DCI messages may indicate that the remaining DCI messages are not associated with new data (e.g., the NDI field may be set of a value of "0"). This is because the initial DCI message schedules a transmission of new data (e.g., the one-to-many sidelink communication), whereas the remaining DCI messages schedule a transmission of the same data as the initial DCI message (e.g., the one-to-many sidelink communication) in different spatial transmission directions. Similarly, SCI transmitted by the UE 120 associated with the sidelink communication scheduled by the initial DCI message may include an indication that the sidelink communication is associated with new data. SCI transmitted by the UE 120 associated with the sidelink communication(s) scheduled by the remaining DCI message(s) may include an indication that the sidelink communication(s) are not associated with new data.

In some aspects, each of the separate DCI messages transmitted by the base station 110 (e.g., when using a one-by-one approach) may indicate an uplink control channel resource (e.g., a PUCCH resource) associated with a sidelink communication scheduled by the DCI message. Additionally, each of the separate DCI messages may be associated with different spatial transmission directions of the one or more spatial transmission directions that are associated with the one-to-many sidelink communication. Each DCI message, of the one or more DCI messages transmitted by the base station 110, may indicate a precoder index, a beam index, and/or a sidelink TCI state. For example, each DCI message may schedule the UE 120 to transmit the one-to-many sidelink communication in a given spatial transmission direction.

In some aspects, the UE 120 may receive (e.g., using antenna 252, DEMOD 254, MIMO detector 256, receive processor 258, controller/processor 280, and/or memory 282) an indication to refrain from clearing a buffer of the UE 120 (e.g., a MAC buffer, a HARQ buffer, and/or a transmit buffer) until all transmissions associated with the one-to-many sidelink communication are completed. For example, a DCI message, of the one or more DCI messages, may include an indication that the UE is to refrain from removing information, associated with the one-to-many sidelink communication, from a transmit buffer until each of the one or more sidelink communications have been completed. In other words, the UE 120 may refrain from clearing (e.g., removing information from) a transmit buffer of the UE 120 until each of the one or more sidelink communications, associated with the one-to-many sidelink communication, have been completed. For example, in some aspects, the UE 120 may receive an indication to refrain from clearing a buffer of the UE 120 (e.g., a MAC buffer, a HARQ buffer, and/or a transmit buffer) until the UE 120 receives an indication that each of the one or more sidelink communications have been completed. As used herein, a communication is "completed" based at least in part on receiving or transmitting an indication that the communication was successfully received (e.g., ACK feedback) or based at least in part on a quantity of retransmissions of the communication transmitted by the UE 120 satisfying a threshold (e.g., the quantity of retransmissions of the communication transmitted by the UE 120 reaching a maximum quantity of retransmissions).

In some aspects, each DCI message transmitted by the base station 110 (e.g., using controller/processor 240, transmit processor 220, TX MIMO processor 230, MOD 232, antenna 234, and/or memory 242) may indicate a set of time-frequency resources (e.g., one or more resources for an initial transmission and one or more resources for retransmissions) and an associated precoder index, beam index, and/or sidelink TCI state. The DCI message(s) may use a DCI format 3_0 or another DCI format associated with scheduling sidelink communications. Each DCI message may indicate one PUCCH resource for providing feedback notifications (e.g., HARQ feedback) to the base station 110. The base station 110 may include an indication (e.g., a one-bit indication) that the UE 120 is to refrain from flushing (e.g., clearing or removing information from) a buffer (e.g., a MAC buffer, a HARQ buffer, and/or a transmit buffer) until sidelink communications for all of the spatial transmission directions associated with the one-to-many sidelink communication are completed. In some aspects, all DCI messages associated with the one-to-many sidelink communication may indicate the same HARQ process number (e.g., may indicate the same HARQ feedback process identifier). For example, the base station 110 may determine a HARQ process number associated with a MAC PDU corresponding to the one-to-many sidelink communication. All DCI messages transmitted by the base station 110 (e.g., to schedule a sidelink communications of the one-to-many sidelink communication) may indicate the same HARQ process number.

In cases where the base station 110 uses a single DCI message to schedule multiple transmissions (e.g., in multiple spatial transmission directions) for the one-to-many sidelink communication, the base station 110 may determine the set of spatial transmission directions to be associated with the one-to-many sidelink communication (e.g., based at least in part on the buffer status report transmitted by the UE 120). Additionally, the base station 110 may determine an order of the set of spatial transmission directions (e.g., an order in which the UE 120 is to transmit sidelink communications in the set of spatial transmission directions). For example, the base station 110 may determine a set of precoders (e.g., a set of precoder indices) to be associated with the one-to-many sidelink communication. As another example, the base station 110 may determine a set of beams (e.g., a set of beam indices) to be associated with the one-to-many sidelink communication. As another example, the base station 110 may determine a set of sidelink TCI states to be associated with the one-to-many sidelink communication. In a single DCI message, the base station 110 may indicate resources (e.g., a sidelink grant) for multiple spatial transmission directions (e.g., for each spatial transmission direction included in the set of spatial transmission directions). For example, the single DCI message may indicate sidelink grants for multiple precoders, multiple beams, and/or multiple sidelink TCI states, where each sidelink grant is associated with transmitting the same one-to-many sidelink communication.

For example, a single DCI message may include a list of M resources for initial transmissions, M one or more resources for retransmissions, where M is the quantity of spatial transmission directions associated with the one-to-many sidelink communication (e.g., each of the M resources for initial transmissions may be associated with a given spatial transmission direction, precoder index, beam index, and/or sidelink TCI state). In some aspects, the single DCI message may indicate a single uplink control channel resource (e.g., a single PUCCH resource) for the multiple sidelink transmissions scheduled by the single DCI message. In such examples, the single PUCCH resource may have a size that allows for (e.g., that is large enough for) the UE 120 to multiplex HARQ feedback information associated with the M spatial transmission directions, precoder indices, beam indices, and/or sidelink TCI states. For example, the base station 110 may determine a size of the single PUCCH resource based at least in part on a size of the HARQ feedback information associated with the M spatial transmission directions, precoder indices, beam indices, and/or sidelink TCI states. In some other aspects, the single DCI message may indicate multiple uplink control channel resource (e.g., multiple PUCCH resources) for the multiple sidelink transmissions scheduled by the single DCI message. In such examples, each PUCCH resource may be associated with a given spatial transmission direction, precoder index, beam index, and/or sidelink TCI state. In this way, the UE 120 may be scheduled to provide HARQ feedback on a per-spatial transmission direction basis or a per-beam basis for the one-to-many sidelink communication.

The single DCI message may include an indication that the UE 120 is to refrain from flushing or clearing a buffer (e.g., a MAC buffer, a HARQ buffer, and/or a transmit buffer) of the UE 120 until all sidelink transmissions scheduled by the single DCI message are completed. For example, the UE 120 may refrain from removing information associated with the one-to-many sidelink communication from the buffer until all sidelink transmissions scheduled by the single DCI message are completed.

The single DCI message may include an indication that the first transmission, scheduled by the single DCI message, is associated with new data (e.g., via an NDI field). For example, the single DCI message may include an indication that the first sidelink communication (e.g., in time) scheduled to be transmitted by the UE 120 is associated with new data, whereas subsequent sidelink communications (e.g., in time) scheduled by the single DCI are not associated with new data. The single DCI message may include an indication that all sidelink communications scheduled by the single DCI message are associated with the same HARQ process number, in a similar manner as described above.

As shown by reference number 620, the UE 120 may transmit (e.g., using controller/processor 280, transmit processor 264, TX MIMO processor 266, MOD 254, antenna 252, and/or memory 282), to the UEs 605-1 through 605-n, one or more sidelink communications (e.g., of the one-to-many sidelink communication) over the one or more spatial transmission directions associated with the one-to-many sidelink communication. For example, in scenarios where a one-by-one approach is used by the base station 110 to schedule the one or more sidelink communications, the UE 120 may receive a first DCI message indicating a first set of time-frequency resources and a first spatial transmission direction. The UE 120 may transmit (e.g., as shown by reference number 620) the one-to-many sidelink communication using the first set of time-frequency resources and in the first spatial transmission direction. As shown by reference number 625, the UE 120 may receive (e.g., from one or more UEs of the UEs 605-1 through 605-n) feedback information indicating whether the one-to-many sidelink communication was successfully transmitted in the first spatial transmission direction. In some aspects, if the feedback information indicates that one-to-many sidelink communication was not successfully transmitted in the first spatial transmission direction, then the UE 120 may transmit a retransmission of the one-to-many sidelink communication (not shown in FIG. 6) using resources indicated by the first DCI message. As shown by reference number 630, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), HARQ feedback information associated with the one-to-many sidelink communication was successfully transmitted in the first spatial transmission direction.

If the HARQ feedback information indicates that the one-to-many sidelink communication was not completed in the first spatial transmission direction, then the base station 110 may transmit another DCI message indicating time-frequency resources to be used by the UE 120 to transmit a retransmission of the one-to-many sidelink communication in the first spatial transmission direction. The UE 120 and the base station 110 may repeat these operations until the one-to-many sidelink communication is completed in the first spatial transmission direction (e.g., until ACK feedback is received or transmitted and/or until a maximum quantity of retransmissions is reached). Based at least in part on the one-to-many sidelink communication being completed in the first spatial transmission direction, the base station 110 may transmit, and the UE 120 may receive, a second first DCI message indicating a second set of time-frequency resources and a second spatial transmission direction. The UE 120 may transmit the one-to-many sidelink communication using the second set of time-frequency resources and in the second spatial transmission direction. In a similar manner as shown by reference number 625, the UE 120 may receive (e.g., from one or more UEs of the UEs 605-1 through 605-n) feedback information indicating whether the one-to-many sidelink communication was successfully transmitted in the second spatial transmission direction.

In some aspects, if the feedback information indicates that one-to-many sidelink communication was not successfully transmitted in the second spatial transmission direction, then the UE 120 may transmit a retransmission of the one-to-many sidelink communication (not shown in FIG. 6) using resources indicated by the second DCI message. In a similar manner as shown by reference number 630, the UE 120 may transmit, and the base station 110 may receive, HARQ feedback information associated with the one-to-many sidelink communication was successfully transmitted in the second spatial transmission direction. The base station 110 and the UE 120 may repeat the operations described above (e.g., in connection with reference numbers 615, 620, 625, and 630) in a one-by-one manner for all the spatial transmission directions (e.g., all the preorders, beams, and/or sidelink TCI states) associated with the one-to-many sidelink communication.

In examples where a single DCI message schedules multiple sidelink transmissions for the one-to-many sidelink communication, the UE 120 may transmit one or more sidelink communications (e.g., of the one-to-many sidelink communication) in each spatial transmission direction indicated by the single DCI message. In some aspects, for each spatial transmission direction (e.g., for each spatial transmission direction, for each beam, and/or for each sidelink TCI state) the UE 120 may transmit SCI indicating resources to be used by the UE 120 for retransmissions in the spatial transmission direction (e.g., retransmission resources corresponding to a retransmission in the same spatial transmission direction as the spatial transmission direction used to transmit the SCI). Additionally, or alternatively, the SCI may indicate one or more resources for retransmissions or initial transmissions in another spatial transmission direction. In such examples, the SCI may include an indication of a precoder, beam, and/or sidelink TCI state associated with the other spatial transmission direction.

In some aspects, SCI associated with a first sidelink communication scheduled (e.g., in time) by the single DCI message may include an indication that the first sidelink communication is associated with new data (e.g., in an NDI field of the SCI). Subsequent SCI transmitted by the UE 120 for subsequent sidelink communications (e.g., to be transmitted by the UE 120 after the first sidelink transmission in time) may not include an indication that the subsequent sidelink communications are associated with new data. For example, the single DCI message may schedule a first sidelink communication (e.g., first in the time domain). The UE 120 may transmit SCI associated with the first sidelink communication that indicates that the first sidelink communication and/or the SCI is associated with new data. The Single DCI message may schedule a second sidelink communication (e.g., that is to be transmitted by the UE 120 after the first sidelink communication in the time domain). The UE 120 may transmit SCI associated with the second sidelink communication that indicates that the second sidelink communication and/or the SCI is not associated with new data.

As shown by reference number 625, the UE 120 may receive (e.g., using antenna 252, DEMOD 254, MIMO detector 256, receive processor 258, controller/processor 280, and/or memory 282) feedback information (e.g., on the PSFCH) associated with the sidelink communications transmitted by the UE 120. The UE 120 may associate the feedback with a sidelink communication and/or a spatial transmission direction. As shown by reference number 630, the UE 120 may transmit (e.g., using controller/processor 280, transmit processor 264, TX MIMO processor 266, MOD 254, antenna 252, and/or memory 282), and the base station 110 may receive (e.g., using antenna 234, DEMOD 232, MIMO detector 236, receive processor 238, controller/processor 240, and/or memory 242), HARQ feedback associated with the sidelink communications transmitted by the UE 120 (e.g., that are scheduled by the single DCI message).

In some aspects, the UE 120 may transmit the HARQ feedback using a resource that is associated with the same spatial transmission direction as the sidelink communication corresponding to the HARQ feedback. For example, the single DCI message may allocate PUCCH resources for each spatial transmission direction indicated by the single DCI message. The UE 120 may use a PUCCH resource, to transmit HARQ feedback for a sidelink communication that is transmitted in a given spatial transmission direction, that is associated with the given spatial transmission direction (e.g., as indicated by the single DCI message). In some other aspects, the UE 120 may transmit HARQ feedback for multiple sidelink transmissions and/or multiple spatial transmission directions using a single PUCCH resource. For example, the UE 120 may multiplex HARQ feedback for multiple sidelink transmissions and/or multiple spatial transmission directions on a single PUCCH resource. For example, HARQ feedback for multiple sidelink transmissions and/or multiple spatial transmission directions may be multiplexed (e.g., by the UE 120) on one or more PUCCH resources. The UE 120 may include an indication of the sidelink transmission and/or the spatial transmission direction associated with each HARQ feedback indication transmitted using the single PUCCH resource.

As shown by reference number 635, the base station 110 may transmit (e.g., using controller/processor 240, transmit processor 220, TX MIMO processor 230, MOD 232, antenna 234, and/or memory 242), and the UE 120 may receive (e.g., using antenna 252, DEMOD 254, MIMO detector 256, receive processor 258, controller/processor 280, and/or memory 282), DCI scheduling a retransmission of the one-to-many sidelink communication. For example, based at least in part on the HARQ feedback transmitted by the UE 120, the base station 110 may identify one or more spatial transmission directions over which the one-to-many sidelink communication was not completed (e.g., was not successfully transmitted and/or in which a maximum quantity of retransmissions has not been reached). The base station 110 may transmit (e.g., using controller/processor 240, transmit processor 220, TX MIMO processor 230, MOD 232, antenna 234, and/or memory 242) DCI scheduling a retransmission of the one-to-many sidelink communication in the identified one or more spatial transmission directions over which the one-to-many sidelink communication was not completed (e.g., in a similar manner as described elsewhere herein). As shown by reference number 640, the UE 120 may transmit (e.g., using controller/processor 280, transmit processor 264, TX MIMO processor 266, MOD 254, antenna 252, and/or memory 282) one or more retransmissions of the one-to-many sidelink communication (e.g., as scheduled by the DCI), in a similar manner as described elsewhere herein. For example, the UE 120 may transmit HARQ feedback associated with the one or more retransmissions of the one-to-many sidelink communication in a similar manner as described elsewhere herein.

As a result, dynamic scheduling (e.g., by the base station 110) of one-to-many sidelink communications for the UE 120 operating using beamformed communications may be enabled. For example, DCI transmitted by the base station 110 may identify spatial transmission directions, beams, precoders, and/or sidelink TCI states that are to be used by the UE 120 for the same one-to-many sidelink communication. Moreover, the DCI may allocate resources for each of the spatial transmission directions, beams, precoders, and/or sidelink TCI states, thereby enabling the UE 120 to transmit the same sidelink communication over multiple spatial transmission directions, beams, precoders, and/or sidelink TCI states. As a result, the UE 120 may be enabled to effectively and efficiently transmit one-to-many sidelink communications when operating in a Mode 1 transmission mode and when using beamformed communications.

As indicated above, FIG. 6 is provided as an example. Other examples may differ from what is described with respect to FIG. 6.

Figure 7:
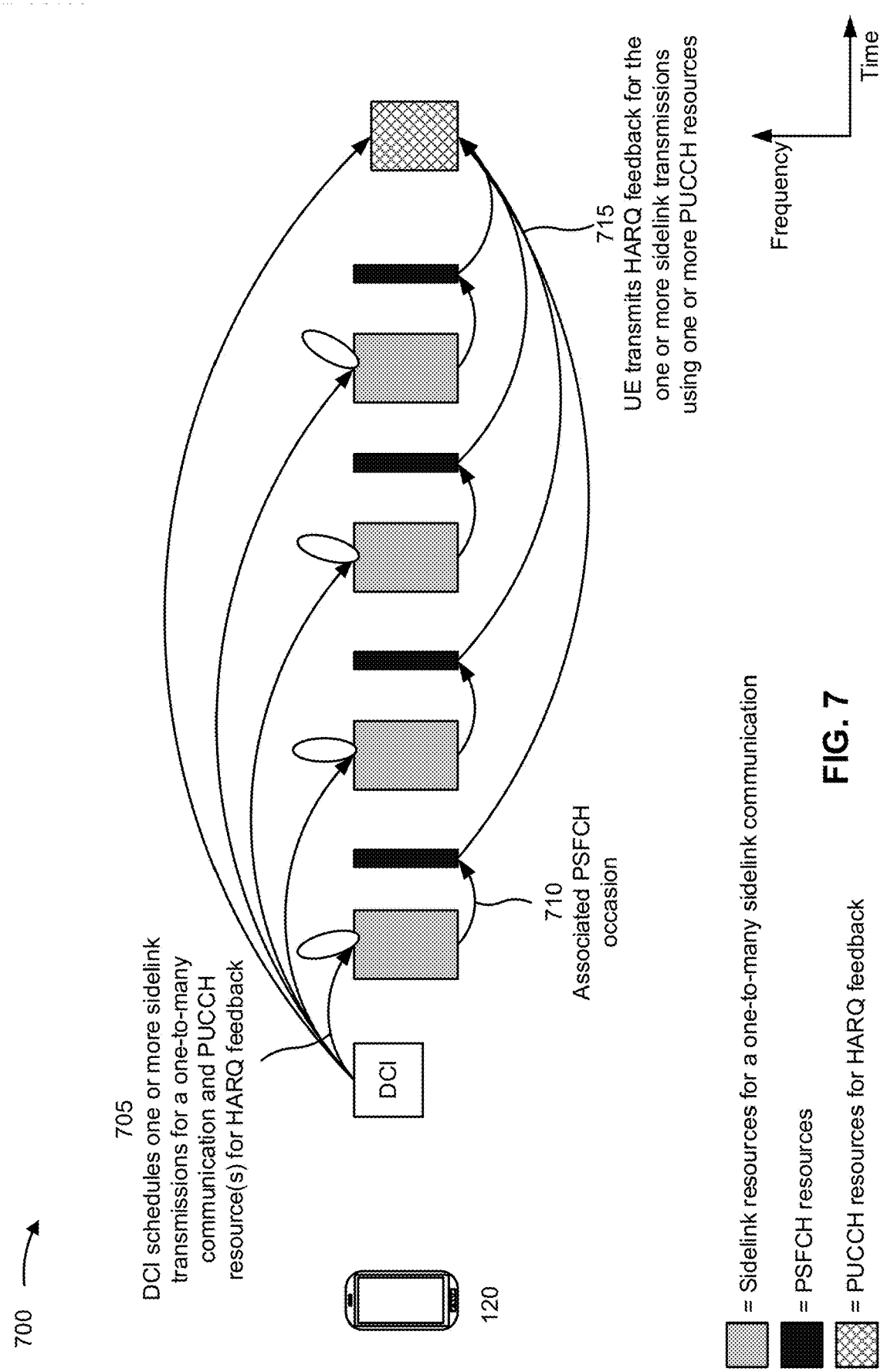
FIG. 7 is a diagram illustrating an example of dynamic scheduling of one-to-many sidelink communications, in accordance with the present disclosure.

FIG. 7 is a diagram illustrating an example 700 of dynamic scheduling of one-to-many sidelink communications, in accordance with the present disclosure. Example 700 may be associated with a single DCI that schedules multiple transmissions of a one-to-many sidelink communication over multiple spatial transmission directions, in a similar manner as described in more detail elsewhere herein, such as in connection with FIG. 6. For example, a UE 120 may receive a DCI message. The DCI message may indicate a set of sidelink resources for a one-to-many sidelink communication.

For example, as shown by reference number 705, the DCI message may schedule one or more sidelink transmissions of the one-to-many sidelink communication. Each sidelink transmission may be associated with a different spatial transmission direction. For example, the DCI message may indicate a first set of sidelink resources (e.g., time-frequency resources) and may indicate a first spatial transmission direction (e.g., a precoder index, a beam index, and/or a sidelink TCI state) associated with the first set of sidelink resources. Similarly, the DCI message may indicate a second set of sidelink resources (e.g., time-frequency resources) and may indicate a second spatial transmission direction (e.g., a precoder index, a beam index, and/or a sidelink TCI state) associated with the second set of sidelink resources. The DCI message may allocate sidelink resources associated with multiple spatial transmission directions associated with the one-to-many sidelink communication in a similar manner. Additionally, the DCI message may indicate one or more PUCCH resources to be used by the UE 120 to transmit HARQ feedback associated with the one or more sidelink transmissions scheduled by the DCI message. In the example 700, a single PUCCH resource is depicted. In other examples, the DCI message may indicate multiple PUCCH resources (e.g., a PUCCH resource for each sidelink transmission scheduled by the DCI message).

As shown in FIG. 7, each sidelink resource scheduled by the DCI message may be associated with one or more PSFCH resources. For example, as shown by reference number 710, a first set of sidelink resources may be associated with a first PSFCH occasion. The PSFCH occasion may be used by a receiving device (e.g., another UE or another device) to transmit feedback information (e.g., ACK/NACK feedback) associated with the one-to-many sidelink communication that is transmitted using the first set of sidelink resources. As shown in FIG. 7, each set of sidelink resources allocated by the DCI message may be associated with a PSFCH occasion.

As shown in FIG. 7, the UE 120 may transmit the one-to-many sidelink communication in each of the sidelink resources indicated by the DCI message. Additionally, as shown in FIG. 7, the UE 120 may transmit the one-to-many sidelink communication in different spatial transmission directions using each of the sidelink resources indicated by the DCI message. For example, a first set of sidelink resources may be used to transmit the one-to-many sidelink communication in a first spatial transmission direction, using a first beam, using a first precoder, and/or using a first sidelink TCI state. A second set of sidelink resources may be used to transmit the one-to-many sidelink communication in a second spatial transmission direction, using a second beam, using a second precoder, and/or using a second sidelink TCI state.

As shown by reference number 715, the UE 120 may transmit HARQ feedback, to a base station 110, HARQ feedback for the one or more sidelink transmissions using the PUCCH resource(s) indicated by the DCI message. For example, the UE 120 may receive feedback information via the PSFCH occasion(s). The UE 120 may associate the feedback information with a sidelink transmission and/or a spatial transmission direction. The UE 120 may transmit HARQ feedback for each spatial transmission direction associated with the one-to-many sidelink communication. For example, the UE 120 may multiplex HARQ feedback for each of the sidelink transmissions (e.g., for each spatial transmission direction) indicated by the DCI message. The UE 120 may indicate a sidelink transmission and/or a spatial transmission direction associated with each HARQ feedback information transmitted by the UE 120. In this way, the base station 110 may be enabled to identify spatial transmission directions over which the one-to-many sidelink communication was not successfully transmitted by the UE 120.

As indicated above, FIG. 7 is provided as an example. Other examples may differ from what is described with respect to FIG. 7.

Figure 8:
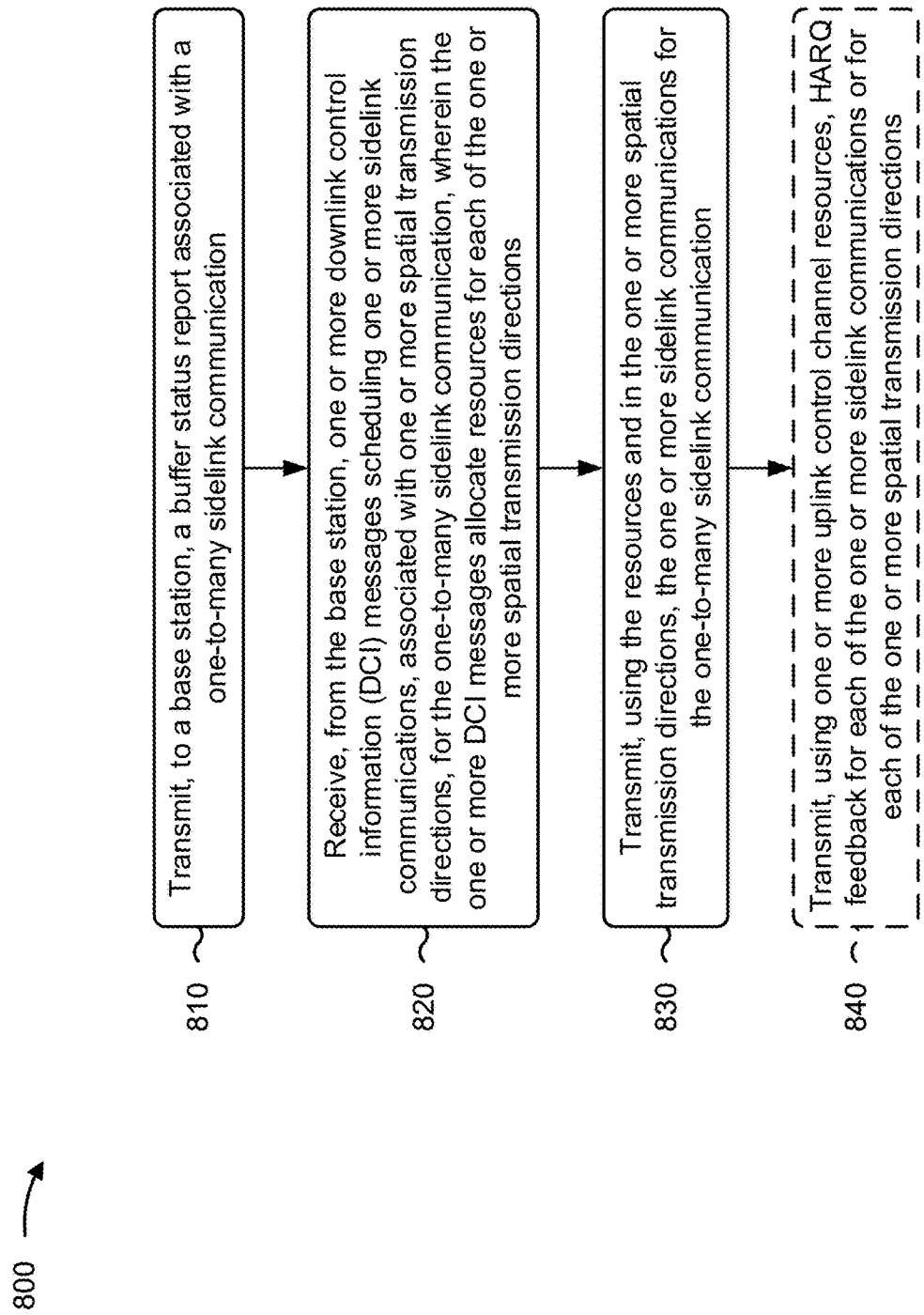
FIGS. 8 and 9 are diagrams illustrating example processes associated with dynamic scheduling of one-to-many sidelink communications, in accordance with the present disclosure.

FIG. 8 is a diagram illustrating an example process 800 performed, for example, by a UE, in accordance with the present disclosure. Example process 800 is an example where the UE (e.g., UE 120) performs operations associated with dynamic scheduling of one-to-many sidelink communications.

As shown in FIG. 8, in some aspects, process 800 may include transmitting, to a base station, a buffer status report associated with a one-to-many sidelink communication (block 810). For example, the UE (e.g., using communication manager 140 and/or transmission component 1004, depicted in FIG. 10) may transmit, to a base station, a buffer status report associated with a one-to-many sidelink communication, as described above. For example, the UE may transmit the buffer status report in a similar manner as described above in connection with FIG. 6 and reference number 610.

As further shown in FIG. 8, in some aspects, process 800 may include receiving, from the base station, one or more DCI messages scheduling one or more sidelink communications, associated with one or more spatial transmission directions, for the one-to-many sidelink communication, wherein the one or more DCI messages allocate resources for each of the one or more spatial transmission directions (block 820). For example, the UE (e.g., using communication manager 140 and/or reception component 1002, depicted in FIG. 10) may receive, from the base station, one or more DCI messages scheduling one or more sidelink communications, associated with one or more spatial transmission directions, for the one-to-many sidelink communication, wherein the one or more DCI messages allocate resources for each of the one or more spatial transmission directions, as described above. For example, the one or more DCI messages may allocate sidelink resources for the one-to-many sidelink communication for each of the one or more spatial transmission directions (e.g., on a per-spatial transmission direction basis). For example, the UE may receive one or more DCI messages scheduling one or more sidelink communications in a similar manner as described above in connection with FIG. 6 and reference number 615.

As further shown in FIG. 8, in some aspects, process 800 may include transmitting, using the resources and in the one or more spatial transmission directions, the one or more sidelink communications for the one-to-many sidelink communication (block 830). For example, the UE (e.g., using communication manager 140 and/or transmission component 1004, depicted in FIG. 10) may transmit, using the resources and in the one or more spatial transmission directions, the one or more sidelink communications for the one-to-many sidelink communication, as described above. For example, the UE 120 may transmit the one-to-many sidelink communication over the one or more spatial transmission directions (e.g., using a separate sidelink communication or sidelink transmission for each spatial transmission direction). For example, the UE may transmit the one or more sidelink communications for the one-to-many sidelink communication in a similar manner as described above in connection with FIG. 6 and reference number 620.

As further shown in FIG. 8, in some aspects, process 800 may optionally include transmitting, using one or more uplink control channel resources, HARQ feedback for each of the one or more sidelink communications or for each of the one or more spatial transmission directions (block 840). For example, the UE (e.g., using communication manager 140 and/or transmission component 1004, depicted in FIG. 10) may transmit, using one or more uplink control channel resources, HARQ feedback for each of the one or more sidelink communications or for each of the one or more spatial transmission directions, as described above. The one or more uplink control channel resources may be indicated by the DCI. For example, the UE may transmit the HARQ feedback for each of the one or more sidelink communications or for each of the one or more spatial transmission directions in a similar manner as described above in connection with FIG. 6 and reference number 630.

Process 800 may include additional aspects, such as any single aspect or any combination of aspects described below and/or in connection with one or more other processes described elsewhere herein.

In a first aspect, the one or more spatial transmission directions are associated with at least one of one or more precoders, one or more beams, or one or more sidelink TCI states.

In a second aspect, alone or in combination with the first aspect, the buffer status report includes an indication of a logical channel group identifier associated with the one-to-many sidelink communication, and wherein the logical channel group identifier indicates that the one-to-many sidelink communication is a beamformed communication and indicates a cast-type associated with the one-to-many sidelink communication.

In a third aspect, alone or in combination with one or more of the first and second aspects, the buffer status report includes an indication of at least one of a quantity of the one or more spatial transmission directions, a cast-type associated with the one-to-many sidelink communication, a HARQ feedback type associated with the one-to-many sidelink communication, or one or more priorities associated with the one or more spatial transmission directions.

In a fourth aspect, alone or in combination with one or more of the first through third aspects, the one or more DCI messages indicate one or more uplink control channel resources associated with HARQ feedback for the one or more sidelink communications, and wherein the one or more DCI messages indicate that HARQ feedback is to be provided for each of the one or more sidelink communications or for each of the one or more spatial transmission directions.

In a fifth aspect, alone or in combination with one or more of the first through fourth aspects, process 800 includes transmitting, to the base station using the one or more uplink control channel resources, HARQ feedback for each of the one or more sidelink communications or for each of the one or more spatial transmission directions.

In a sixth aspect, alone or in combination with one or more of the first through fifth aspects, receiving the one or more DCI messages includes receiving separate DCI messages for each of the one or more sidelink communications.

In a seventh aspect, alone or in combination with one or more of the first through sixth aspects, each of the separate DCI messages indicates an uplink control channel resource associated with a sidelink communication of the one or more sidelink communications.

In an eighth aspect, alone or in combination with one or more of the first through seventh aspects, each of the separate DCI messages is associated with different spatial transmission directions of the one or more spatial transmission directions.

In a ninth aspect, alone or in combination with one or more of the first through eighth aspects, each of the separate DCI messages indicates a different precoder index, a different beam index, or a different sidelink TCI state.

In a tenth aspect, alone or in combination with one or more of the first through ninth aspects, at least one DCI message, of the separate DCI messages, includes an indication that the UE is to refrain from removing information, associated with the one-to-many sidelink communication, from a transmit buffer until each of the one or more sidelink communications have been completed.

In an eleventh aspect, alone or in combination with one or more of the first through tenth aspects, a DCI message, of the separate DCI messages, that is received first in time includes an indication that the DCI message is associated with new data, and wherein remaining DCI messages, of the separate DCI messages, do not include indications that the remaining DCI messages are associated with new data.

In a twelfth aspect, alone or in combination with one or more of the first through eleventh aspects, the indication that the DCI message is associated with new data is included in an NDI field of the DCI message.

In a thirteenth aspect, alone or in combination with one or more of the first through twelfth aspects, each of the separate DCI messages are associated with a same HARQ feedback process identifier.

In a fourteenth aspect, alone or in combination with one or more of the first through thirteenth aspects, receiving the one or more DCI messages includes receiving a first DCI message, of the one or more DCI messages, scheduling a first sidelink communication, of the one or more sidelink communications, wherein the first DCI message allocates a first set of resources for the first sidelink communication, wherein the first DCI message allocates a first uplink control channel resource associated with HARQ feedback for the first sidelink communication, and wherein the first DCI message indicates a first spatial transmission direction of the one or more spatial transmission directions, and wherein transmitting the one or more sidelink communications for the one-to-many sidelink communication includes transmitting, using the first set of resources and the first spatial transmission direction, the first sidelink communication.

In a fifteenth aspect, alone or in combination with one or more of the first through fourteenth aspects, process 800 includes receiving, from another UE, feedback information associated with the first sidelink communication, and transmitting, to the base station using the first uplink control channel resource, HARQ feedback, for the first sidelink communication, that is based at least in part on the feedback information.

In a sixteenth aspect, alone or in combination with one or more of the first through fifteenth aspects, the feedback information indicates that the first sidelink communication was not successfully received by the other UE, the method further comprising receiving, from the base station, another DCI message scheduling a retransmission of the first sidelink communication using the first spatial transmission direction.

In a seventeenth aspect, alone or in combination with one or more of the first through sixteenth aspects, the feedback information indicates that the first sidelink communication was successfully received by the other UE or a quantity of retransmissions associated with the first sidelink communication satisfies a threshold, and wherein receiving the one or more DCI messages includes receiving a second DCI message, of the one or more DCI messages, scheduling a second sidelink communication, of the one or more sidelink communications, wherein the second DCI message allocates a second set of resources for the second sidelink communication, wherein the second DCI message allocates a second uplink control channel resource associated with HARQ feedback for the second sidelink communication, and wherein the second DCI message indicates a second spatial transmission direction of the one or more spatial transmission directions.

In an eighteenth aspect, alone or in combination with one or more of the first through seventeenth aspects, transmitting the one or more sidelink communications for the one-to-many sidelink communication includes transmitting, using the second set of resources and the second spatial transmission direction, the second sidelink communication.

In a nineteenth aspect, alone or in combination with one or more of the first through eighteenth aspects, the one or more DCI messages are a single DCI message, and wherein the single DCI message indicates a sidelink grant for each of the one or more sidelink communications.

In a twentieth aspect, alone or in combination with one or more of the first through nineteenth aspects, the single DCI message indicates one or more identifiers associated with the one or more spatial transmission directions.

In a twenty-first aspect, alone or in combination with one or more of the first through twentieth aspects, the one or more identifiers include at least one of one or more precoder indices, one or more beam indices, or one or more sidelink TCI states.

In a twenty-second aspect, alone or in combination with one or more of the first through twenty-first aspects, the single DCI message indicates one or more uplink control channel resources associated with HARQ feedback for the one or more sidelink communications.

In a twenty-third aspect, alone or in combination with one or more of the first through twenty-second aspects, the single DCI message indicates one or more sidelink grants, and wherein transmitting the one or more sidelink communications for the one-to-many sidelink communication includes transmitting, using the one or more sidelink grants indicated by the single DCI message, the one or more sidelink communications, receiving, from one or more other UEs, feedback information associated with the one or more sidelink communications, and transmitting, to the base station, HARQ feedback for the one or more sidelink communications using one or more uplink control channel resources indicated by the single DCI message.

In a twenty-fourth aspect, alone or in combination with one or more of the first through twenty-third aspects, the HARQ feedback indicates that at least one sidelink communication, of the one or more sidelink communications, was not successfully transmitted, the method further comprising receiving another DCI message scheduling a retransmission for the at least one sidelink communication, wherein the other DCI message indicates that the UE is to use a spatial transmission direction, of the one or more spatial transmission directions, that is associated with the at least one sidelink communication.

In a twenty-fifth aspect, alone or in combination with one or more of the first through twenty-fourth aspects, transmitting the HARQ feedback for the one or more sidelink communications includes transmitting, using an uplink control channel resource of the one or more uplink control channel resources, HARQ feedback for multiple sidelink communications, of the one or more sidelink communications, wherein the HARQ feedback for the multiple sidelink communications are multiplexed on the uplink control channel resource.

In a twenty-sixth aspect, alone or in combination with one or more of the first through twenty-fifth aspects, the single DCI message indicates that the single DCI message is associated with new data.

In a twenty-seventh aspect, alone or in combination with one or more of the first through twenty-sixth aspects, the single DCI message indicates that each of the one or more sidelink communications are associated with a same HARQ feedback process identifier.

In a twenty-eighth aspect, alone or in combination with one or more of the first through twenty-seventh aspects, transmitting the one or more sidelink communications for the one-to-many sidelink communication includes transmitting a first sidelink communication, of the one or more sidelink communications, using a first spatial transmission direction, of the one or more spatial transmission directions, that is indicated by the single DCI message as being associated with the first sidelink communication, and transmitting a second sidelink communication, of the one or more sidelink communications, using a second spatial transmission direction, of the one or more spatial transmission directions, that is indicated by the single DCI message as being associated with the second sidelink communication.

In a twenty-ninth aspect, alone or in combination with one or more of the first through twenty-eighth aspects, the first sidelink communication includes sidelink control information, and wherein the sidelink control information indicates at least one of a first one or more resources associated with a first retransmission of the first sidelink communication and that the first one or more resources are associated with the first spatial transmission direction, or a second one or more resources associated with a second retransmission of another sidelink communication, of the one or more sidelink communications, and that the second one or more resources are associated with another spatial transmission direction of the one or more spatial transmission directions.

In a thirtieth aspect, alone or in combination with one or more of the first through twenty-ninth aspects, the first sidelink communication is transmitted first in a time domain, among the one or more sidelink communications, wherein the first sidelink communication includes sidelink control information, and wherein the sidelink control information indicates that the first sidelink communication is associated with new data.

In a thirty-first aspect, alone or in combination with one or more of the first through thirtieth aspects, the second sidelink communication is not transmitted first in a time domain, among the one or more sidelink communications, wherein the second sidelink communication includes sidelink control information, and wherein the sidelink control information indicates that the second sidelink communication is not associated with new data.

In a thirty-second aspect, alone or in combination with one or more of the first through thirty-first aspects, process 800 includes receiving, from the base station, an indication of a DCI grant type to be associated with one-to-many sidelink communications, wherein the one or more DCI messages use the DCI grant type.

In a thirty-third aspect, alone or in combination with one or more of the first through thirty-second aspects, the indication of the DCI grant type is received via at least one of an RRC configuration message, a semi-static configuration message, a MAC-CE, a dynamic message, or a DCI message.

In a thirty-fourth aspect, alone or in combination with one or more of the first through thirty-third aspects, the DCI grant type is associated with a sidelink resource pool.

In a thirty-fifth aspect, alone or in combination with one or more of the first through thirty-fourth aspects, the DCI grant type is based at least in part on at least one of information indicated by the buffer status report, a sidelink UE information message, or a sidelink UE assistance information message.

In a thirty-sixth aspect, alone or in combination with one or more of the first through thirty-fifth aspects, the one-to-many sidelink communication is a broadcast communication, a groupcast communication, or a multicast communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
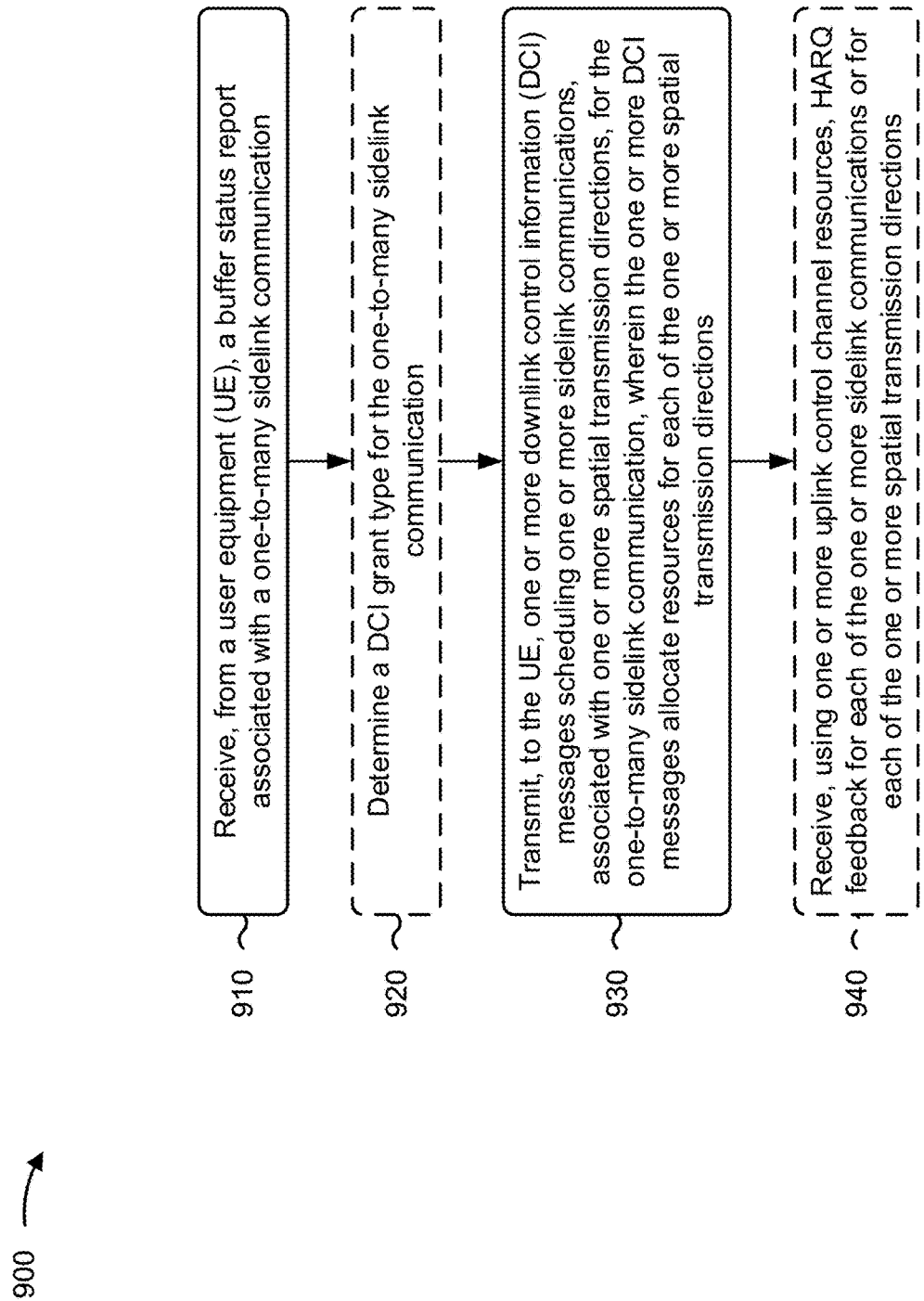

FIG. 9 is a diagram illustrating an example process 900 performed, for example, by a base station, in accordance with the present disclosure. Example process 900 is an example where the base station (e.g., base station 110) performs operations associated with dynamic scheduling of one-to-many sidelink communications.

As shown in FIG. 9, in some aspects, process 900 may include receiving, from a UE, a buffer status report associated with a one-to-many sidelink communication (block 910). For example, the base station (e.g., using communication manager 150 and/or reception component 1102, depicted in FIG. 11) may receive, from a UE, a buffer status report associated with a one-to-many sidelink communication, as described above. For example, the base station may receive the buffer status report in a similar manner as described above in connection with FIG. 6 and reference number 610.

As further shown in FIG. 9, in some aspects, process 900 may optionally include determining a DCI grant type for the one-to-many sidelink communication (block 920). For example, the base station (e.g., using communication manager 150 and/or determination component 1108, depicted in FIG. 11) may determine a DCI grant type for the one-to-many sidelink communication, as described above. For example, the base station may determine the DCI grant type based at least in part on the buffer status report.

As further shown in FIG. 9, in some aspects, process 900 may include transmitting, to the UE, one or more DCI messages scheduling one or more sidelink communications, associated with one or more spatial transmission directions, for the one-to-many sidelink communication, wherein the one or more DCI messages allocate resources for each of the one or more spatial transmission directions (block 930). For example, the base station (e.g., using communication manager 150 and/or transmission component 1104, depicted in FIG. 11) may transmit, to the UE, one or more DCI messages scheduling one or more sidelink communications, associated with one or more spatial transmission directions, for the one-to-many sidelink communication, wherein the one or more DCI messages allocate resources for each of the one or more spatial transmission directions, as described above. In some aspects, the one or more DCI messages may use the DCI grant type determined by the base station. The one or more DCI messages may allocate sidelink resources for each of the one or more spatial transmission directions (e.g., may allocate resources on a per-spatial transmission direction basis). For example, the base station may transmit the one or more DCI messages scheduling one or more sidelink communications in a similar manner as described above in connection with FIG. 6 and reference number 615.

As further shown in FIG. 9, in some aspects, process 900 may optionally include receiving, from the UE using one or more uplink control channel resources, HARQ feedback for each of the one or more sidelink communications or for each of the one or more spatial transmission directions (block 940). For example, the base station (e.g., using communication manager 150 and/or reception component 1102, depicted in FIG. 11) may receive, from the UE using one or more uplink control channel resources, HARQ feedback for each of the one or more sidelink communications or for each of the one or more spatial transmission directions, as described above. In some aspects, the one or more DCI messages may use the DCI grant type determined by the base station. The one or more uplink control channel resources may be indicated via the DCI. For example, the base station may receive the HARQ feedback for each of the one or more sidelink communications or for each of the one or more spatial transmission directions in a similar manner as described above in connection with FIG. 6 and reference number 630.

Process 900 may include additional aspects, such as any single aspect or any combination of aspects described below and/or in connection with one or more other processes described elsewhere herein.

In a first aspect, the one or more spatial transmission directions are associated with at least one of one or more precoders, one or more beams, or one or more sidelink TCI states.

In a second aspect, alone or in combination with the first aspect, the buffer status report includes an indication of a logical channel group identifier associated with the one-to-many sidelink communication, and wherein the logical channel group identifier indicates that the one-to-many sidelink communication is a beamformed communication and indicates a cast-type associated with the one-to-many sidelink communication.

In a third aspect, alone or in combination with one or more of the first and second aspects, the buffer status report includes an indication of at least one of a quantity of the one or more spatial transmission directions, a cast-type associated with the one-to-many sidelink communication, a HARQ feedback type associated with the one-to-many sidelink communication, or one or more priorities associated with the one or more spatial transmission directions.

In a fourth aspect, alone or in combination with one or more of the first through third aspects, the one or more DCI messages indicate one or more uplink control channel resources associated with HARQ feedback for the one or more sidelink communications, and wherein the one or more DCI messages indicate that HARQ feedback is to be provided for each of the one or more sidelink communications or for each of the one or more spatial transmission directions.

In a fifth aspect, alone or in combination with one or more of the first through fourth aspects, process 900 includes receiving, from the UE using the one or more uplink control channel resources, HARQ feedback for each of the one or more sidelink communications or for each of the one or more spatial transmission directions.

In a sixth aspect, alone or in combination with one or more of the first through fifth aspects, transmitting the one or more DCI messages includes transmitting separate DCI messages for each of the one or more sidelink communications.

In a seventh aspect, alone or in combination with one or more of the first through sixth aspects, each of the separate DCI messages indicates an uplink control channel resource associated with a sidelink communication of the one or more sidelink communications.

In an eighth aspect, alone or in combination with one or more of the first through seventh aspects, each of the separate DCI messages is associated with different spatial transmission directions of the one or more spatial transmission directions.

In a ninth aspect, alone or in combination with one or more of the first through eighth aspects, each of the separate DCI messages indicates a different precoder index, a different beam index, or a different sidelink TCI state.

In a tenth aspect, alone or in combination with one or more of the first through ninth aspects, at least one DCI message, of the separate DCI messages, includes an indication that the UE is to refrain from removing information, associated with the one-to-many sidelink communication, from a transmit buffer until each of the one or more sidelink communications have been completed.

In an eleventh aspect, alone or in combination with one or more of the first through tenth aspects, a DCI message, of the separate DCI messages, that is transmitted first in time, includes an indication that the DCI message is associated with new data, and wherein remaining DCI messages, of the separate DCI messages, do not include indications that the remaining DCI messages are associated with new data.

In a twelfth aspect, alone or in combination with one or more of the first through eleventh aspects, the indication that the DCI message is associated with new data is included in an NDI field of the DCI message.

In a thirteenth aspect, alone or in combination with one or more of the first through twelfth aspects, each of the separate DCI messages are associated with a same HARQ feedback process identifier.

In a fourteenth aspect, alone or in combination with one or more of the first through thirteenth aspects, transmitting the one or more DCI messages includes transmitting a first DCI message, of the one or more DCI messages, scheduling a first sidelink communication, of the one or more sidelink communications, wherein the first DCI message allocates a first set of resources for the first sidelink communication, wherein the first DCI message allocates a first uplink control channel resource associated with HARQ feedback for the first sidelink communication, and wherein the first DCI message indicates a first spatial transmission direction of the one or more spatial transmission directions.

In a fifteenth aspect, alone or in combination with one or more of the first through fourteenth aspects, process 900 includes receiving, from the UE using the first uplink control channel resource, HARQ feedback, for the first sidelink communication.

In a sixteenth aspect, alone or in combination with one or more of the first through fifteenth aspects, the HARQ feedback indicates that the first sidelink communication was not successfully transmitted, the method further comprising transmitting, to the UE, another DCI message scheduling a retransmission of the first sidelink communication using the first spatial transmission direction.

In a seventeenth aspect, alone or in combination with one or more of the first through sixteenth aspects, HARQ feedback indicates that the first sidelink communication was successfully received by the other UE or a quantity of retransmissions associated with the first sidelink communication satisfies a threshold, and wherein receiving the one or more DCI messages includes transmitting a second DCI message, of the one or more DCI messages, scheduling a second sidelink communication, of the one or more sidelink communications, wherein the second DCI message allocates a second set of resources for the second sidelink communication, wherein the second DCI message allocates a second uplink control channel resource associated with HARQ feedback for the second sidelink communication, and wherein the second DCI message indicates a second spatial transmission direction of the one or more spatial transmission directions.

In an eighteenth aspect, alone or in combination with one or more of the first through seventeenth aspects, the one or more DCI messages are a single DCI message, and wherein the single DCI message indicates a sidelink grant for each of the one or more sidelink communications.

In a nineteenth aspect, alone or in combination with one or more of the first through eighteenth aspects, the single DCI message indicates one or more identifiers associated with the one or more spatial transmission directions.

In a twentieth aspect, alone or in combination with one or more of the first through nineteenth aspects, the one or more identifiers include at least one of one or more precoder indices, one or more beam indices, or one or more sidelink TCI states.

In a twenty-first aspect, alone or in combination with one or more of the first through twentieth aspects, the single DCI message indicates one or more uplink control channel resources associated with HARQ feedback for the one or more sidelink communications.

In a twenty-second aspect, alone or in combination with one or more of the first through twenty-first aspects, process 900 includes receiving, from the UE, HARQ feedback for the one or more sidelink communications using one or more uplink control channel resources indicated by the single DCI message.

In a twenty-third aspect, alone or in combination with one or more of the first through twenty-second aspects, the HARQ feedback indicates that at least one sidelink communication, of the one or more sidelink communications, was not successfully transmitted, the method further comprising transmitting, to the UE, another DCI message scheduling a retransmission for the at least one sidelink communication, wherein the other DCI message indicates that the UE is to use a spatial transmission direction, of the one or more spatial transmission directions, that is associated with the at least one sidelink communication.

In a twenty-fourth aspect, alone or in combination with one or more of the first through twenty-third aspects, receiving the HARQ feedback for the one or more sidelink communications includes receiving, using an uplink control channel resource of the one or more uplink control channel resources, HARQ feedback for multiple sidelink communications, of the one or more sidelink communications, wherein the HARQ feedback for the multiple sidelink communications are multiplexed on the uplink control channel resource.

In a twenty-fifth aspect, alone or in combination with one or more of the first through twenty-fourth aspects, the single DCI message indicates that the single DCI message is associated with new data.

In a twenty-sixth aspect, alone or in combination with one or more of the first through twenty-fifth aspects, the single DCI message indicates that each of the one or more sidelink communications are associated with a same HARQ feedback process identifier.

In a twenty-seventh aspect, alone or in combination with one or more of the first through twenty-sixth aspects, process 900 includes transmitting, to the UE, an indication of the DCI grant type to be associated with one-to-many sidelink communications, wherein the one or more DCI messages use the DCI grant type.

In a twenty-eighth aspect, alone or in combination with one or more of the first through twenty-seventh aspects, the indication of the DCI grant type is transmitted via at least one of an RRC configuration message, a semi-static configuration message, a MAC-CE, a dynamic message, or a DCI message.

In a twenty-ninth aspect, alone or in combination with one or more of the first through twenty-eighth aspects, the DCI grant type is associated with a sidelink resource pool.

In a thirtieth aspect, alone or in combination with one or more of the first through twenty-ninth aspects, the DCI grant type is based at least in part on at least one of information indicated by the buffer status report, a sidelink UE information message, or a sidelink UE assistance information message.

In a thirty-first aspect, alone or in combination with one or more of the first through thirtieth aspects, the one-to-many sidelink communication is a broadcast communication, a groupcast communication, or a multicast communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
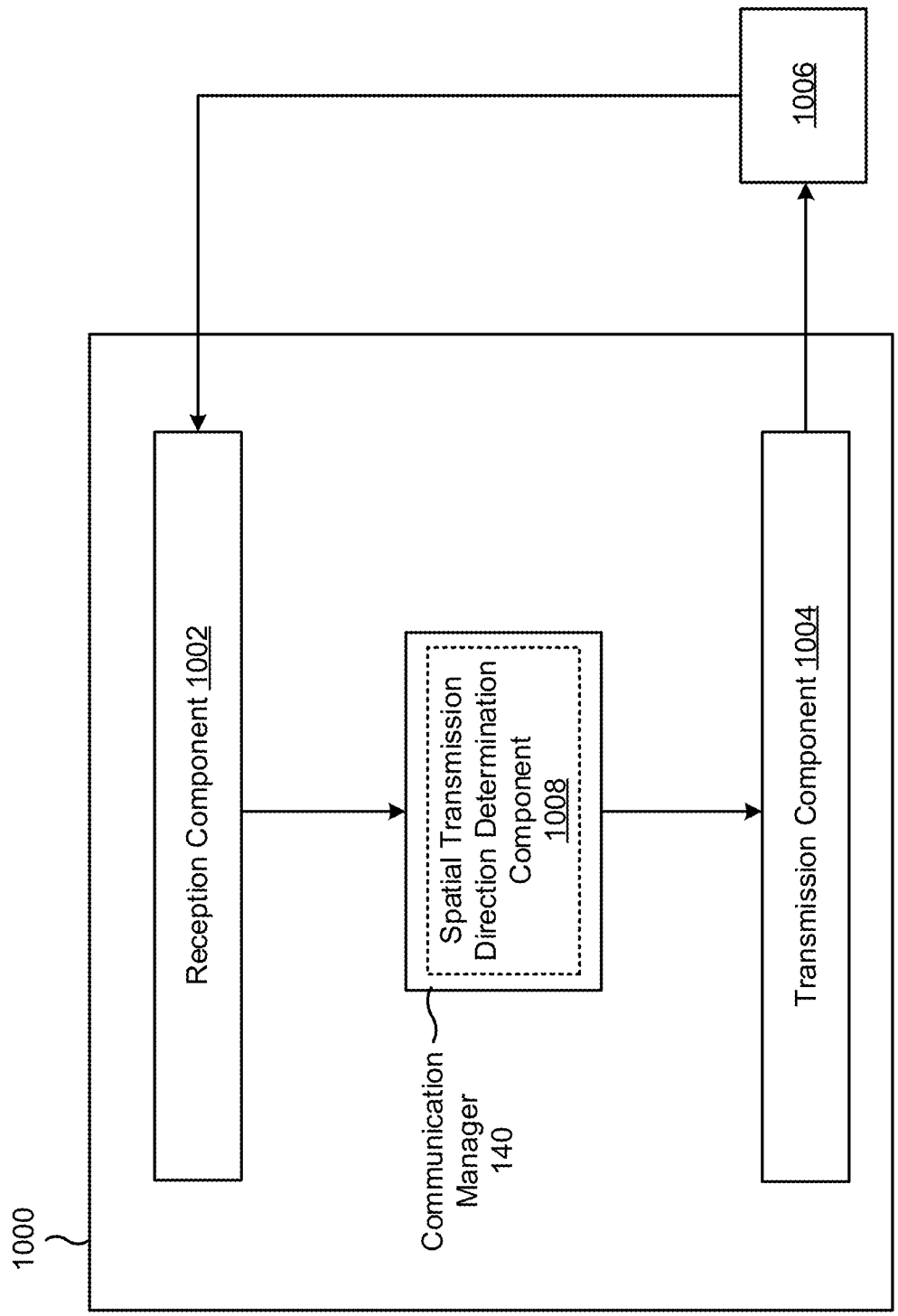
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a spatial transmission direction determination component 1008, among other examples.

In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit, to a base station, a buffer status report associated with a one-to-many sidelink communication. The reception component 1002 may receive, from the base station, one or more DCI messages scheduling one or more sidelink communications, associated with one or more spatial transmission directions, for the one-to-many sidelink communication, wherein the one or more DCI messages allocate resources for each of the one or more spatial transmission directions. The transmission component 1004 may transmit, using the resources and in the one or more spatial transmission directions, the one or more sidelink communications for the one-to-many sidelink communication.

The spatial transmission direction determination component 1008 may determine a spatial transmission direction, of the one or more spatial transmission directions, for a given sidelink communication of the one-to-many sidelink communication based at least in part on the one or more DCI messages. For example, the spatial transmission direction determination component 1008 may identify a precoder index, a beam, index, or a sidelink TCI state, via the one or more DCI messages, that is associated with the given sidelink communication of the one-to-many sidelink communication. The transmission component 1004 may transmit multiple sidelink communications of the one-to-many sidelink communication in different spatial transmission directions.

The transmission component 1004 may transmit, to the base station using the one or more uplink control channel resources, HARQ feedback for each of the one or more sidelink communications or for each of the one or more spatial transmission directions.

The reception component 1002 may receive, from another UE, feedback information associated with the first sidelink communication.

The transmission component 1004 may transmit, to the base station using the first uplink control channel resource, HARQ feedback, for the first sidelink communication, that is based at least in part on the feedback information.

The reception component 1002 may receive, from the base station, an indication of a DCI grant type to be associated with one-to-many sidelink communications, wherein the one or more DCI messages use the DCI grant type.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
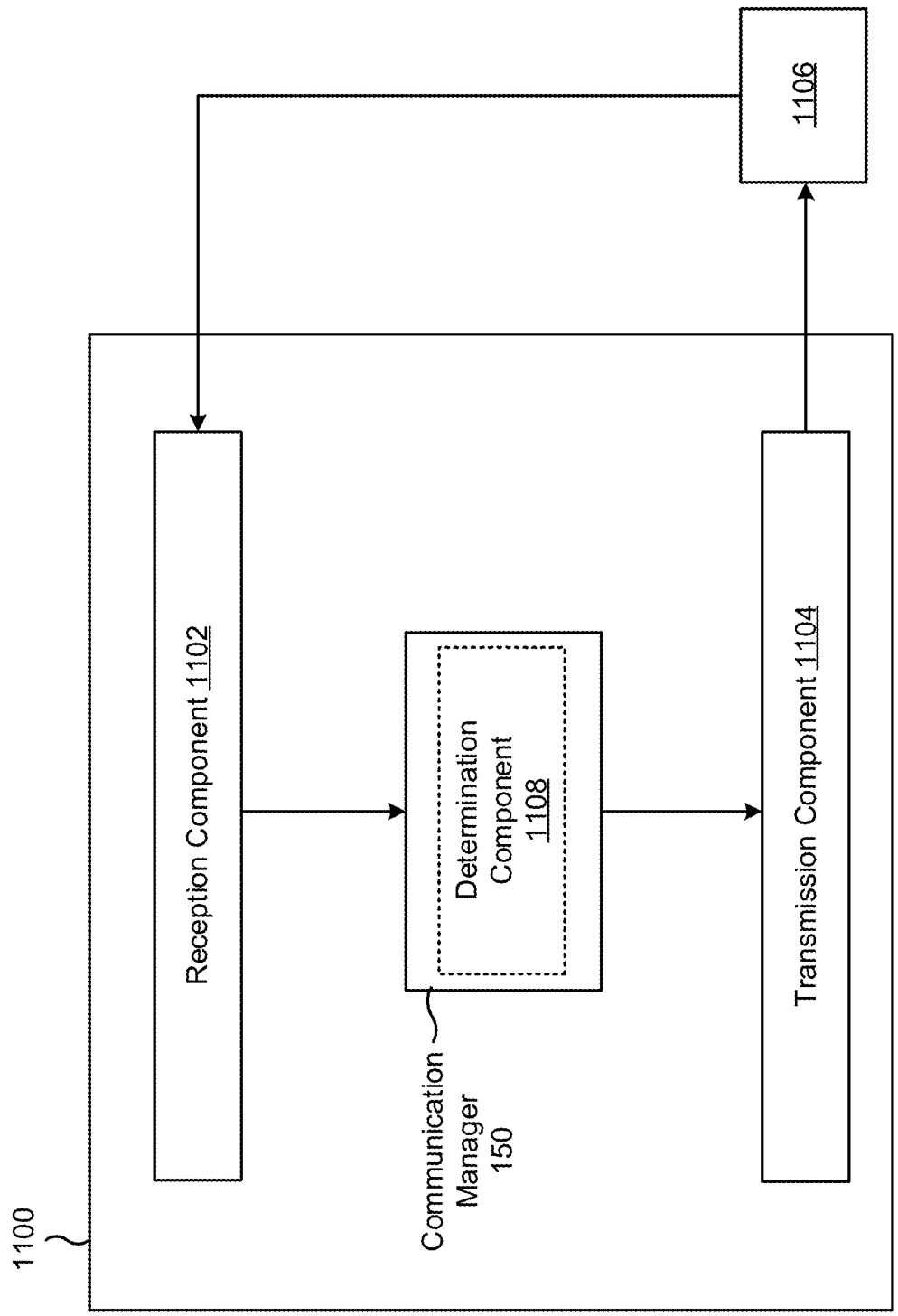

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 6 and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The reception component 1102 may receive, from a UE, a buffer status report associated with a one-to-many sidelink communication. The transmission component 1104 may transmit, to the UE, one or more DCI messages scheduling one or more sidelink communications, associated with one or more spatial transmission directions, for the one-to-many sidelink communication, wherein the one or more DCI messages allocate resources for each of the one or more spatial transmission directions.

The reception component 1102 may receive, from the UE using the one or more uplink control channel resources, HARQ feedback for each of the one or more sidelink communications or for each of the one or more spatial transmission directions.

The reception component 1102 may receive, from the UE using the first uplink control channel resource, HARQ feedback, for the first sidelink communication.

The reception component 1102 may receive, from the UE, HARQ feedback for the one or more sidelink communications using one or more uplink control channel resources indicated by the single DCI message.

The transmission component 1104 may transmit, to the UE, an indication of a DCI grant type to be associated with one-to-many sidelink communications, wherein the one or more DCI messages use the DCI grant type.

The determination component 1108 may determine the DCI grant type to be associated with one-to-many sidelink communications. In some aspects, the determination component 1108 may determine the DCI grant type to be associated with one-to-many sidelink communications based at least in part on the buffer status report.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting, to a base station, a buffer status report associated with a one-to-many sidelink communication; receiving, from the base station, one or more downlink control information (DCI) messages scheduling one or more sidelink communications, associated with one or more spatial transmission directions, for the one-to-many sidelink communication, wherein the one or more DCI messages allocate resources for each of the one or more spatial transmission directions; and transmitting, using the resources and in the one or more spatial transmission directions, the one or more sidelink communications for the one-to-many sidelink communication.

Aspect 2: The method of Aspect 1, wherein the one or more spatial transmission directions are associated with at least one of: one or more precoders, one or more beams, or one or more sidelink transmission configuration indicator (TCI) states.

Aspect 3: The method of any of Aspects 1-2, wherein the buffer status report includes an indication of a logical channel group identifier associated with the one-to-many sidelink communication, and wherein the logical channel group identifier indicates that the one-to-many sidelink communication is a beamformed communication and indicates a cast-type associated with the one-to-many sidelink communication.

Aspect 4: The method of any of Aspects 1-3, wherein the buffer status report includes an indication of at least one of: a quantity of the one or more spatial transmission directions, a cast-type associated with the one-to-many sidelink communication, a hybrid automatic repeat request (HARQ) feedback type associated with the one-to-many sidelink communication, or one or more priorities associated with the one or more spatial transmission directions.

Aspect 5: The method of any of Aspects 1-4, wherein the one or more DCI messages indicate one or more uplink control channel resources associated with hybrid automatic repeat request (HARQ) feedback for the one or more sidelink communications, and wherein the one or more DCI messages indicate that HARQ feedback is to be provided for each of the one or more sidelink communications or for each of the one or more spatial transmission directions.

Aspect 6: The method of Aspect 5, further comprising: transmitting, to the base station using the one or more uplink control channel resources, HARQ feedback for each of the one or more sidelink communications or for each of the one or more spatial transmission directions.

Aspect 7: The method of any of Aspects 1-6, wherein receiving the one or more DCI messages comprises: receiving separate DCI messages for each of the one or more sidelink communications.

Aspect 8: The method of Aspect 7, wherein each of the separate DCI messages indicates an uplink control channel resource associated with a sidelink communication of the one or more sidelink communications.

Aspect 9: The method of any of Aspects 7-8, wherein each of the separate DCI messages is associated with different spatial transmission directions of the one or more spatial transmission directions.

Aspect 10: The method of any of Aspects 7-9, wherein each of the separate DCI messages indicates a different precoder index, a different beam index, or a different sidelink transmission configuration indicator (TCI) state.

Aspect 11: The method of any of Aspects 7-10, wherein at least one DCI message, of the separate DCI messages, includes an indication that the UE is to refrain from removing information, associated with the one-to-many sidelink communication, from a transmit buffer until each of the one or more sidelink communications have been completed.

Aspect 12: The method of any of Aspects 7-11, wherein a DCI message, of the separate DCI messages, that is received first in time includes an indication that the DCI message is associated with new data, and wherein remaining DCI messages, of the separate DCI messages, do not include indications that the remaining DCI messages are associated with new data.

Aspect 13: The method of Aspect 12, wherein the indication that the DCI message is associated with new data is included in a new data indicator (NDI) field of the DCI message.

Aspect 14: The method of any of Aspects 7-13, wherein each of the separate DCI messages are associated with a same hybrid automatic repeat request (HARQ) feedback process identifier.

Aspect 15: The method of any of Aspects 1-14, wherein receiving the one or more DCI messages comprises: receiving a first DCI message, of the one or more DCI messages, scheduling a first sidelink communication, of the one or more sidelink communications, wherein the first DCI message allocates a first set of resources for the first sidelink communication, wherein the first DCI message allocates a first uplink control channel resource associated with hybrid automatic repeat request (HARQ) feedback for the first sidelink communication, and wherein the first DCI message indicates a first spatial transmission direction of the one or more spatial transmission directions; and wherein transmitting the one or more sidelink communications for the one-to-many sidelink communication comprises: transmitting, using the first set of resources and the first spatial transmission direction, the first sidelink communication.

Aspect 16: The method of Aspect 15, further comprising: receiving, from another UE, feedback information associated with the first sidelink communication; and transmitting, to the base station using the first uplink control channel resource, HARQ feedback, for the first sidelink communication, that is based at least in part on the feedback information.

Aspect 17: The method of Aspect 16, wherein the feedback information indicates that the first sidelink communication was not successfully received by the other UE, the method further comprising: receiving, from the base station, another DCI message scheduling a retransmission of the first sidelink communication using the first spatial transmission direction.

Aspect 18: The method of any of Aspects 16-17, wherein the feedback information indicates that the first sidelink communication was successfully received by the other UE or a quantity of retransmissions associated with the first sidelink communication satisfies a threshold, and wherein receiving the one or more DCI messages comprises: receiving a second DCI message, of the one or more DCI messages, scheduling a second sidelink communication, of the one or more sidelink communications, wherein the second DCI message allocates a second set of resources for the second sidelink communication, wherein the second DCI message allocates a second uplink control channel resource associated with HARQ feedback for the second sidelink communication, and wherein the second DCI message indicates a second spatial transmission direction of the one or more spatial transmission directions.

Aspect 19: The method of Aspect 18, wherein transmitting the one or more sidelink communications for the one-to-many sidelink communication comprises: transmitting, using the second set of resources and the second spatial transmission direction, the second sidelink communication.

Aspect 20: The method of any of Aspects 1-19, wherein the one or more DCI messages are a single DCI message, and wherein the single DCI message indicates a sidelink grant for each of the one or more sidelink communications.

Aspect 21: The method of Aspect 20, wherein the single DCI message indicates one or more identifiers associated with the one or more spatial transmission directions.

Aspect 22: The method of Aspect 21, wherein the one or more identifiers include at least one of: one or more precoder indices, one or more beam indices, or one or more sidelink transmission configuration indicator (TCI) states.

Aspect 23: The method of any of Aspects 20-22, wherein the single DCI message indicates one or more uplink control channel resources associated with hybrid automatic repeat request (HARQ) feedback for the one or more sidelink communications.

Aspect 24: The method of any of Aspects 20-23, wherein the single DCI message indicates one or more sidelink grants, and wherein transmitting the one or more sidelink communications for the one-to-many sidelink communication comprises: transmitting, using the one or more sidelink grants indicated by the single DCI message, the one or more sidelink communications; receiving, from one or more other UEs, feedback information associated with the one or more sidelink communications; and transmitting, to the base station, hybrid automatic repeat request (HARQ) feedback for the one or more sidelink communications using one or more uplink control channel resources indicated by the single DCI message.

Aspect 25: The method of Aspect 24, wherein the HARQ feedback indicates that at least one sidelink communication, of the one or more sidelink communications, was not successfully transmitted, the method further comprising: receiving another DCI message scheduling a retransmission for the at least one sidelink communication, wherein the other DCI message indicates that the UE is to use a spatial transmission direction, of the one or more spatial transmission directions, that is associated with the at least one sidelink communication.

Aspect 26: The method of any of Aspects 24-25, wherein transmitting the HARQ feedback for the one or more sidelink communications comprises: transmitting, using an uplink control channel resource of the one or more uplink control channel resources, HARQ feedback for multiple sidelink communications, of the one or more sidelink communications, wherein the HARQ feedback for the multiple sidelink communications are multiplexed on the uplink control channel resource.

Aspect 27: The method of any of Aspects 20-26, wherein the single DCI message indicates that the single DCI message is associated with new data.

Aspect 28: The method of any of Aspects 20-27, wherein the single DCI message indicates that each of the one or more sidelink communications are associated with a same hybrid automatic repeat request (HARQ) feedback process identifier.

Aspect 29: The method of any of Aspects 20-28, wherein transmitting the one or more sidelink communications for the one-to-many sidelink communication comprises: transmitting a first sidelink communication, of the one or more sidelink communications, using a first spatial transmission direction, of the one or more spatial transmission directions, that is indicated by the single DCI message as being associated with the first sidelink communication; and transmitting a second sidelink communication, of the one or more sidelink communications, using a second spatial transmission direction, of the one or more spatial transmission directions, that is indicated by the single DCI message as being associated with the second sidelink communication.

Aspect 30: The method of Aspect 29, wherein the first sidelink communication includes sidelink control information, and wherein the sidelink control information indicates at least one of: a first one or more resources associated with a first retransmission of the first sidelink communication and that the first one or more resources are associated with the first spatial transmission direction; or a second one or more resources associated with a second retransmission of another sidelink communication, of the one or more sidelink communications, and that the second one or more resources are associated with another spatial transmission direction of the one or more spatial transmission directions.

Aspect 31: The method of any of Aspects 29-30, wherein the first sidelink communication is transmitted first in a time domain, among the one or more sidelink communications, wherein the first sidelink communication includes sidelink control information, and wherein the sidelink control information indicates that the first sidelink communication is associated with new data.

Aspect 32: The method of any of Aspects 29-31, wherein the second sidelink communication is not transmitted first in a time domain, among the one or more sidelink communications, wherein the second sidelink communication includes sidelink control information, and wherein the sidelink control information indicates that the second sidelink communication is not associated with new data.

Aspect 33: The method of any of Aspects 1-32, further comprising: receiving, from the base station, an indication of a DCI grant type to be associated with one-to-many sidelink communications, wherein the one or more DCI messages use the DCI grant type.

Aspect 34: The method of Aspect 33, wherein the indication of the DCI grant type is received via at least one of: a radio resource control (RRC) configuration message, a semi-static configuration message, a medium access control (MAC) control element (MAC-CE), a dynamic message, or a DCI message.

Aspect 35: The method of any of Aspects 33-34, wherein the DCI grant type is associated with a sidelink resource pool.

Aspect 36: The method of any of Aspects 33-35, wherein the DCI grant type is based at least in part on at least one of: information indicated by the buffer status report, a sidelink UE information message, or a sidelink UE assistance information message.

Aspect 37: The method of any of Aspects 1-36, wherein the one-to-many sidelink communication is a broadcast communication, a groupcast communication, or a multicast communication.

Aspect 38: A method of wireless communication performed by a base station, comprising: receiving, from a user equipment (UE), a buffer status report associated with a one-to-many sidelink communication; and transmitting, to the UE, one or more downlink control information (DCI) messages scheduling one or more sidelink communications, associated with one or more spatial transmission directions, for the one-to-many sidelink communication, wherein the one or more DCI messages allocate resources for each of the one or more spatial transmission directions.

Aspect 39: The method of Aspect 38, wherein the one or more spatial transmission directions are associated with at least one of: one or more precoders, one or more beams, or one or more sidelink transmission configuration indicator (TCI) states.

Aspect 40: The method of any of Aspects 38-39, wherein the buffer status report includes an indication of a logical channel group identifier associated with the one-to-many sidelink communication, and wherein the logical channel group identifier indicates that the one-to-many sidelink communication is a beamformed communication and indicates a cast-type associated with the one-to-many sidelink communication.

Aspect 41: The method of any of Aspects 38-40, wherein the buffer status report includes an indication of at least one of: a quantity of the one or more spatial transmission directions, a cast-type associated with the one-to-many sidelink communication, a hybrid automatic repeat request (HARQ) feedback type associated with the one-to-many sidelink communication, or one or more priorities associated with the one or more spatial transmission directions.

Aspect 42: The method of any of Aspects 38-41, wherein the one or more DCI messages indicate one or more uplink control channel resources associated with hybrid automatic repeat request (HARQ) feedback for the one or more sidelink communications, and wherein the one or more DCI messages indicate that HARQ feedback is to be provided for each of the one or more sidelink communications or for each of the one or more spatial transmission directions.

Aspect 43: The method of Aspect 42, further comprising: receiving, from the UE using the one or more uplink control channel resources, HARQ feedback for each of the one or more sidelink communications or for each of the one or more spatial transmission directions.

Aspect 44: The method of any of Aspects 38-43, wherein transmitting the one or more DCI messages comprises: transmitting separate DCI messages for each of the one or more sidelink communications.

Aspect 45: The method of Aspect 44, wherein each of the separate DCI messages indicates an uplink control channel resource associated with a sidelink communication of the one or more sidelink communications.

Aspect 46: The method of any of Aspects 44-45, wherein each of the separate DCI messages is associated with different spatial transmission directions of the one or more spatial transmission directions.

Aspect 47: The method of any of Aspects 44-46, wherein each of the separate DCI messages indicates a different precoder index, a different beam index, or a different sidelink transmission configuration indicator (TCI) state.

Aspect 48: The method of any of Aspects 44-47, wherein at least one DCI message, of the separate DCI messages, includes an indication that the UE is to refrain from removing information, associated with the one-to-many sidelink communication, from a transmit buffer until each of the one or more sidelink communications have been completed.

Aspect 49: The method of any of Aspects 44-48, wherein a DCI message, of the separate DCI messages, that is transmitted first in time, includes an indication that the DCI message is associated with new data, and wherein remaining DCI messages, of the separate DCI messages, do not include indications that the remaining DCI messages are associated with new data.

Aspect 50: The method of Aspect 49, wherein the indication that the DCI message is associated with new data is included in a new data indicator (NDI) field of the DCI message.

Aspect 51: The method of any of Aspects 44-50, wherein each of the separate DCI messages are associated with a same hybrid automatic repeat request (HARQ) feedback process identifier.

Aspect 52: The method of any of Aspects 38-51, wherein transmitting the one or more DCI messages comprises: transmitting a first DCI message, of the one or more DCI messages, scheduling a first sidelink communication, of the one or more sidelink communications, wherein the first DCI message allocates a first set of resources for the first sidelink communication, wherein the first DCI message allocates a first uplink control channel resource associated with hybrid automatic repeat request (HARQ) feedback for the first sidelink communication, and wherein the first DCI message indicates a first spatial transmission direction of the one or more spatial transmission directions.

Aspect 53: The method of Aspect 52, further comprising: receiving, from the UE using the first uplink control channel resource, HARQ feedback, for the first sidelink communication.

Aspect 54: The method of Aspect 53, wherein the HARQ feedback indicates that the first sidelink communication was not successfully transmitted, the method further comprising: transmitting, to the UE, another DCI message scheduling a retransmission of the first sidelink communication using the first spatial transmission direction.

Aspect 55: The method of any of Aspects 53-54, wherein HARQ feedback indicates that the first sidelink communication was successfully received by the other UE or a quantity of retransmissions associated with the first sidelink communication satisfies a threshold, and wherein receiving the one or more DCI messages comprises: transmitting a second DCI message, of the one or more DCI messages, scheduling a second sidelink communication, of the one or more sidelink communications, wherein the second DCI message allocates a second set of resources for the second sidelink communication, wherein the second DCI message allocates a second uplink control channel resource associated with HARQ feedback for the second sidelink communication, and wherein the second DCI message indicates a second spatial transmission direction of the one or more spatial transmission directions.

Aspect 56: The method of any of Aspects 38-55, wherein the one or more DCI messages are a single DCI message, and wherein the single DCI message indicates a sidelink grant for each of the one or more sidelink communications.

Aspect 57: The method of Aspect 56, wherein the single DCI message indicates one or more identifiers associated with the one or more spatial transmission directions.

Aspect 58: The method of Aspect 57, wherein the one or more identifiers include at least one of: one or more precoder indices, one or more beam indices, or one or more sidelink transmission configuration indicator (TCI) states.

Aspect 59: The method of any of Aspects 56-58, wherein the single DCI message indicates one or more uplink control channel resources associated with hybrid automatic repeat request (HARQ) feedback for the one or more sidelink communications.

Aspect 60: The method of any of Aspects 56-59, further comprising: receiving, from the UE, hybrid automatic repeat request (HARQ) feedback for the one or more sidelink communications using one or more uplink control channel resources indicated by the single DCI message.

Aspect 61: The method of Aspect 60, wherein the HARQ feedback indicates that at least one sidelink communication, of the one or more sidelink communications, was not successfully transmitted, the method further comprising: transmitting, to the UE, another DCI message scheduling a retransmission for the at least one sidelink communication, wherein the other DCI message indicates that the UE is to use a spatial transmission direction, of the one or more spatial transmission directions, that is associated with the at least one sidelink communication.

Aspect 62: The method of any of Aspects 60-61, wherein receiving the HARQ feedback for the one or more sidelink communications comprises: receiving, using an uplink control channel resource of the one or more uplink control channel resources, HARQ feedback for multiple sidelink communications, of the one or more sidelink communications, wherein the HARQ feedback for the multiple sidelink communications are multiplexed on the uplink control channel resource.

Aspect 63: The method of any of Aspects 56-62, wherein the single DCI message indicates that the single DCI message is associated with new data.

Aspect 64: The method of any of Aspects 56-63, wherein the single DCI message indicates that each of the one or more sidelink communications are associated with a same hybrid automatic repeat request (HARQ) feedback process identifier.

Aspect 65: The method of any of Aspects 38-64, further comprising: transmitting, to the UE, an indication of a DCI grant type to be associated with one-to-many sidelink communications, wherein the one or more DCI messages use the DCI grant type.

Aspect 66: The method of Aspect 65, wherein the indication of the DCI grant type is transmitted via at least one of: a radio resource control (RRC) configuration message, a semi-static configuration message, a medium access control (MAC) control element (MAC-CE), a dynamic message, or a DCI message.

Aspect 67: The method of any of Aspects 65-66, wherein the DCI grant type is associated with a sidelink resource pool.

Aspect 68: The method of any of Aspects 65-67, wherein the DCI grant type is based at least in part on at least one of: information indicated by the buffer status report, a sidelink UE information message, or a sidelink UE assistance information message.

Aspect 69: The method of any of Aspects 38-68, wherein the one-to-many sidelink communication is a broadcast communication, a groupcast communication, or a multicast communication.

Aspect 70: An apparatus for wireless communication at a device, comprising a processor; memory coupled with the processor; and instructions stored in the memory and executable by the processor to cause the apparatus to perform the method of one or more of Aspects 1-37.

Aspect 71: A device for wireless communication, comprising a memory and one or more processors coupled to the memory, the one or more processors configured to perform the method of one or more of Aspects 1-37.

Aspect 72: An apparatus for wireless communication, comprising at least one means for performing the method of one or more of Aspects 1-37.

Aspect 73: A non-transitory computer-readable medium storing code for wireless communication, the code comprising instructions executable by a processor to perform the method of one or more of Aspects 1-37.

Aspect 74: A non-transitory computer-readable medium storing a set of instructions for wireless communication, the set of instructions comprising one or more instructions that, when executed by one or more processors of a device, cause the device to perform the method of one or more of Aspects 1-37.

Aspect 75: An apparatus for wireless communication at a device, comprising a processor; memory coupled with the processor; and instructions stored in the memory and executable by the processor to cause the apparatus to perform the method of one or more of Aspects 38-69.

Aspect 76: A device for wireless communication, comprising a memory and one or more processors coupled to the memory, the one or more processors configured to perform the method of one or more of Aspects 38-69.

Aspect 77: An apparatus for wireless communication, comprising at least one means for performing the method of one or more of Aspects 38-69.

Aspect 78: A non-transitory computer-readable medium storing code for wireless communication, the code comprising instructions executable by a processor to perform the method of one or more of Aspects 38-69.

Aspect 79: A non-transitory computer-readable medium storing a set of instructions for wireless communication, the set of instructions comprising one or more instructions that, when executed by one or more processors of a device, cause the device to perform the method of one or more of Aspects 38-69.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to a network entity, a buffer status report associated with a one-to-many sidelink communication;
    receiving, from the network entity, one or more downlink control information (DCI) messages scheduling one or more sidelink communications, associated with a plurality of spatial transmission directions, for the one-to-many sidelink communication, wherein the one or more DCI messages allocate resources for each of the plurality of spatial transmission directions, wherein the plurality of spatial transmission directions correspond to at least one of: one or more precoder indices, one or more beam indices, or one or more sidelink transmission configuration indicator (TCI) states, and wherein the one or more DCI messages include an indication that the UE is to refrain from removing information, associated with the one-to-many sidelink communication, from a transmit buffer until each of the one or more sidelink communications have been completed; and
    transmitting, using the resources and in the plurality of spatial transmission directions, the one or more sidelink communications for the one-to-many sidelink communication.

2. The method of claim 1, wherein the buffer status report includes an indication of a logical channel group identifier associated with the one-to-many sidelink communication, and wherein the logical channel group identifier indicates that the one-to-many sidelink communication is a beamformed communication and indicates a cast-type associated with the one-to-many sidelink communication.

3. The method of claim 1, wherein the buffer status report includes an indication of at least one of:
    a quantity of the plurality of spatial transmission directions,
    a cast-type associated with the one-to-many sidelink communication,
    a hybrid automatic repeat request (HARQ) feedback type associated with the one-to-many sidelink communication, or
    one or more priorities associated with the plurality of spatial transmission directions.

4. The method of claim 1, wherein the one or more DCI messages indicate one or more uplink control channel resources associated with hybrid automatic repeat request (HARQ) feedback for the one or more sidelink communications, and wherein the one or more DCI messages indicate that HARQ feedback is to be provided for each of the one or more sidelink communications or for each of the plurality of spatial transmission directions.

5. The method of claim 1, wherein receiving the one or more DCI messages comprises:
    receiving separate DCI messages for each of the one or more sidelink communications.

6. The method of claim 5, wherein each of the separate DCI messages is associated with different spatial transmission directions of the plurality of spatial transmission directions.

7. The method of claim 5, wherein a DCI message, of the separate DCI messages, that is received first in time includes an indication that the DCI message is associated with new data, and
    wherein remaining DCI messages, of the separate DCI messages, do not include indications that the remaining DCI messages are associated with new data.

8. The method of claim 1, wherein receiving the one or more DCI messages comprises:
    receiving a first DCI message, of the one or more DCI messages, scheduling a first sidelink communication, of the one or more sidelink communications, wherein the first DCI message allocates a first set of resources for the first sidelink communication, wherein the first DCI message allocates a first uplink control channel resource associated with hybrid automatic repeat request (HARQ) feedback for the first sidelink communication, and wherein the first DCI message indicates a first spatial transmission direction of the plurality of spatial transmission directions; and
    wherein transmitting the one or more sidelink communications for the one-to-many sidelink communication comprises:

transmitting, using the first set of resources and the first spatial transmission direction, the first sidelink communication.

9. The method of claim 8, wherein feedback information associated with the first sidelink communication indicates that the first sidelink communication was successfully received by a receiving device or a quantity of retransmissions associated with the first sidelink communication satisfies a threshold, and wherein receiving the one or more DCI messages comprises:
receiving a second DCI message, of the one or more DCI messages, scheduling a second sidelink communication, of the one or more sidelink communications, wherein the second DCI message allocates a second set of resources for the second sidelink communication, wherein the second DCI message allocates a second uplink control channel resource associated with HARQ feedback for the second sidelink communication, and wherein the second DCI message indicates a second spatial transmission direction of the plurality of spatial transmission directions.

10. The method of claim 1, wherein the one or more DCI messages are a single DCI message, and wherein the single DCI message indicates a sidelink grant for each of the one or more sidelink communications.

11. The method of claim 10, wherein the single DCI message indicates one or more identifiers associated with the plurality of spatial transmission directions.

12. The method of claim 10, wherein the single DCI message indicates one or more sidelink grants, and wherein transmitting the one or more sidelink communications for the one-to-many sidelink communication comprises:
transmitting, using the one or more sidelink grants indicated by the single DCI message, the one or more sidelink communications;
receiving, from one or more other UEs, feedback information associated with the one or more sidelink communications; and
transmitting, to the network entity, hybrid automatic repeat request (HARQ) feedback for the one or more sidelink communications using one or more uplink control channel resources indicated by the single DCI message.

13. The method of claim 10, wherein transmitting the one or more sidelink communications for the one-to-many sidelink communication comprises:
transmitting a first sidelink communication, of the one or more sidelink communications, using a first spatial transmission direction, of the plurality of spatial transmission directions, that is indicated by the single DCI message as being associated with the first sidelink communication; and
transmitting a second sidelink communication, of the one or more sidelink communications, using a second spatial transmission direction, of the plurality of spatial transmission directions, that is indicated by the single DCI message as being associated with the second sidelink communication.

14. The method of claim 1, further comprising:
receiving, from the network entity, an indication of a DCI grant type to be associated with one-to-many sidelink communications, wherein the one or more DCI messages use the DCI grant type.

15. The method of claim 1, wherein the one-to-many sidelink communication is a broadcast communication, a groupcast communication, or a multicast communication.

16. A user equipment (UE) for wireless communication, comprising:
one or more memories; and
one or more processors, coupled to the one or more memories, configured to:
transmit, to a network entity, a buffer status report associated with a one-to-many sidelink communication;
receive, from the network entity, one or more downlink control information (DCI) messages scheduling one or more sidelink communications, associated with a plurality of spatial transmission directions, for the one-to-many sidelink communication, wherein the one or more DCI messages allocate resources for each of the plurality of spatial transmission directions, wherein the plurality of spatial transmission directions correspond to at least one of: one or more precoder indices, one or more beam indices, or one or more sidelink transmission configuration indicator (TCI) states, and wherein the one or more DCI messages include an indication that the UE is to refrain from removing information, associated with the one-to-many sidelink communication, from a transmit buffer until each of the one or more sidelink communications have been completed; and
transmit, using the resources and in the plurality of spatial transmission directions, the one or more sidelink communications for the one-to-many sidelink communication.

17. The UE of claim 16, wherein the buffer status report includes an indication of a logical channel group identifier associated with the one-to-many sidelink communication, and wherein the logical channel group identifier indicates that the one-to-many sidelink communication is a beamformed communication and indicates a cast-type associated with the one-to-many sidelink communication.

18. The UE of claim 16, wherein the buffer status report includes an indication of at least one of:
a quantity of the plurality of spatial transmission directions,
a cast-type associated with the one-to-many sidelink communication,
a hybrid automatic repeat request (HARQ) feedback type associated with the one-to-many sidelink communication, or
one or more priorities associated with the plurality of spatial transmission directions.

19. The UE of claim 16, wherein the one or more DCI messages indicate one or more uplink control channel resources associated with hybrid automatic repeat request (HARQ) feedback for the one or more sidelink communications, and wherein the one or more DCI messages indicate that HARQ feedback is to be provided for each of the one or more sidelink communications or for each of the plurality of spatial transmission directions.

20. The UE of claim 16, wherein the one or more processors, to receive the one or more DCI messages, are configured to:
receive separate DCI messages for each of the one or more sidelink communications.

21. The UE of claim 20, wherein each of the separate DCI messages is associated with different spatial transmission directions of the plurality of spatial transmission directions.

22. The UE of claim 16, wherein the one or more processors, to receive the one or more DCI messages, are configured to:

receive a first DCI message, of the one or more DCI messages, scheduling a first sidelink communication, of the one or more sidelink communications, wherein the first DCI message allocates a first set of resources for the first sidelink communication, wherein the first DCI message allocates a first uplink control channel resource associated with hybrid automatic repeat request (HARQ) feedback for the first sidelink communication, and wherein the first DCI message indicates a first spatial transmission direction of the plurality of spatial transmission directions; and wherein the one or more processors, to transmit the one or more sidelink communications for the one-to-many sidelink communication, are configured to:

transmit, using the first set of resources and the first spatial transmission direction, the first sidelink communication.

23. The UE of claim 22, wherein feedback information associated with the first sidelink communication indicates that the first sidelink communication was successfully received by a receiving device or a quantity of retransmissions associated with the first sidelink communication satisfies a threshold, and wherein the one or more processors, to receive the one or more DCI messages, are configured to:

receive a second DCI message, of the one or more DCI messages, scheduling a second sidelink communication, of the one or more sidelink communications, wherein the second DCI message allocates a second set of resources for the second sidelink communication, wherein the second DCI message allocates a second uplink control channel resource associated with HARQ feedback for the second sidelink communication, and wherein the second DCI message indicates a second spatial transmission direction of the plurality of spatial transmission directions.

24. The UE of claim 16, wherein the one or more DCI messages are a single DCI message, and wherein the single DCI message indicates a sidelink grant for each of the one or more sidelink communications.

25. The UE of claim 24, wherein the single DCI message indicates one or more identifiers associated with the plurality of spatial transmission directions.

26. The UE of claim 24, wherein the single DCI message indicates one or more sidelink grants, and wherein the one or more processors, to transmit the one or more sidelink communications for the one-to-many sidelink communication, are configured to:

transmit, using the one or more sidelink grants indicated by the single DCI message, the one or more sidelink communications;

receive, from one or more other UEs, feedback information associated with the one or more sidelink communications; and transmit, to the network entity, hybrid automatic repeat request (HARQ) feedback for the one or more sidelink communications using one or more uplink control channel resources indicated by the single DCI message.

27. The UE of claim 16, wherein the one or more processors are further configured to:

receive, from the network entity, an indication of a DCI grant type to be associated with one-to-many sidelink communications, wherein the one or more DCI messages use the DCI grant type.

28. A non-transitory computer-readable medium storing a set of instructions for wireless communication, the set of instructions comprising:

one or more instructions that, when executed by one or more processors of a user equipment (UE), cause the UE to:

transmit, to a network entity, a buffer status report associated with a one-to-many sidelink communication;

receive, from the network entity, one or more downlink control information (DCI) messages scheduling one or more sidelink communications, associated with a plurality of spatial transmission directions, for the one-to-many sidelink communication, wherein the one or more DCI messages allocate resources for each of the plurality of spatial transmission directions, wherein the plurality of spatial transmission directions correspond to at least one of: one or more precoder indices, one or more beam indices, or one or more sidelink transmission configuration indicator (TCI) states, and wherein the one or more DCI messages include an indication that the UE is to refrain from removing information, associated with the one-to-many sidelink communication, from a transmit buffer until each of the one or more sidelink communications have been completed; and transmit, using the resources and in the plurality of spatial transmission directions, the one or more sidelink communications for the one-to-many sidelink communication.

29. An apparatus for wireless communication, comprising:

means for transmitting, to a network entity, a buffer status report associated with a one-to-many sidelink communication;

means for receiving, from the network entity, one or more downlink control information (DCI) messages scheduling one or more sidelink communications, associated with a plurality of spatial transmission directions, for the one-to-many sidelink communication, wherein the one or more DCI messages allocate resources for each of the plurality of spatial transmission directions, wherein the plurality of spatial transmission directions correspond to at least one of: one or more precoder indices, one or more beam indices, or one or more sidelink transmission configuration indicator (TCI) states, and wherein the one or more DCI messages include an indication that the apparatus is to refrain from removing information, associated with the one-to-many sidelink communication, from a transmit buffer until each of the one or more sidelink communications have been completed; and means for transmitting, using the resources and in the plurality of spatial transmission directions, the one or more sidelink communications for the one-to-many sidelink communication.

30. The non-transitory computer-readable medium of claim 28, wherein transmitting the one or more sidelink communications for the one-to-many sidelink communication comprises:

transmitting a first sidelink communication, of the one or more sidelink communications, using a first spatial transmission direction of the plurality of spatial transmission directions; and transmitting a second sidelink communication, of the one or more sidelink communications, using a second spatial transmission direction of the plurality of spatial transmission directions.

* * * * *